United States Patent [19]

Holland

[11] Patent Number: 4,657,104

[45] Date of Patent: Apr. 14, 1987

[54] CONCENTRIC SHAFT MOBILE BASE FOR ROBOTS AND THE LIKE

[75] Inventor: John M. Holland, Shawsville, Va.

[73] Assignee: Cybermation, Inc., Roanoke, Va.

[21] Appl. No.: 716,671

[22] Filed: Mar. 27, 1985

Related U.S. Application Data

[63] Continuation-in-part of Ser. No. 535,168, Jul. 23, 1983, Pat. No. 4,573,548.

[51] Int. Cl.$^4$ .............................................. B62D 57/00
[52] U.S. Cl. .................................... 180/211; 180/212; 180/252
[58] Field of Search ............... 180/252, 253, 255, 261, 180/267, 209, 210, 211, 212, 6.48

[56] References Cited

U.S. PATENT DOCUMENTS

| | | | |
|---|---|---|---|
| 3,336,993 | 8/1967 | Carobbe | 180/211 |
| 3,822,757 | 7/1974 | Spence | 180/255 |
| 3,858,673 | 1/1975 | Browning | 180/211 |
| 4,221,273 | 9/1980 | Finden | 180/6.48 |
| 4,463,821 | 8/1984 | Falamak | 180/168 |
| 4,529,052 | 7/1985 | Imai et al. | 280/6.48 |

Primary Examiner—David M. Mitchell
Assistant Examiner—Donn McGiehan
Attorney, Agent, or Firm—Alfred A. Fressola; Melvin I. Stoltz; Robert H. Ware

[57] ABSTRACT

A concentric shaft mobile base for robots and the like is disclosed incorporating three wheels which can be simultaneously driven and steered so as to allow the mobile base to change direction without rotation of the mobile base. Concentric shafts transfer power from drive sources to the wheel assemblies and wheel axles. In an additional embodiment, each wheel is located on an extensible leg assembly which can be pivoted to project outwardly from the mobile base and thereby provide additional stability to the base. Concentric shafts are used in this embodiment to transfer steering and drive power to the wheel assemblies and wheels. Planetary gear assemblies are optionally associated with each extensible leg assembly so as to provide controlled retraction and extension of the leg assemblies without wheel slippage or pirouetting.

49 Claims, 53 Drawing Figures

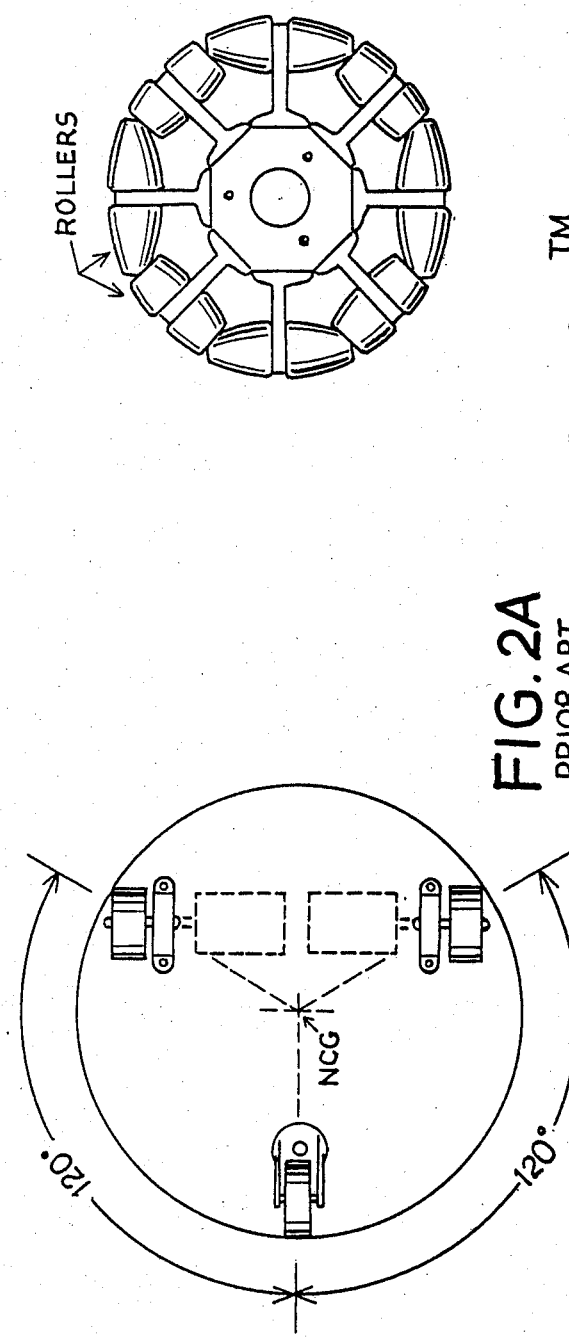
FIG. 2A
PRIOR ART
FIG. 2B
PRIOR ART
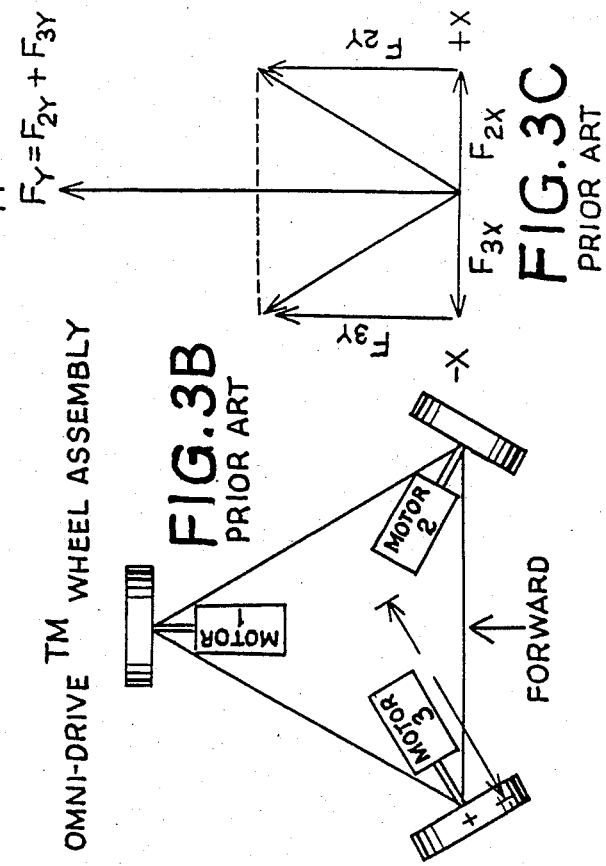
FIG. 3A
PRIOR ART
FIG. 3B
PRIOR ART
FIG. 3C
PRIOR ART

DEFINITION OF PITCH AND ROLL

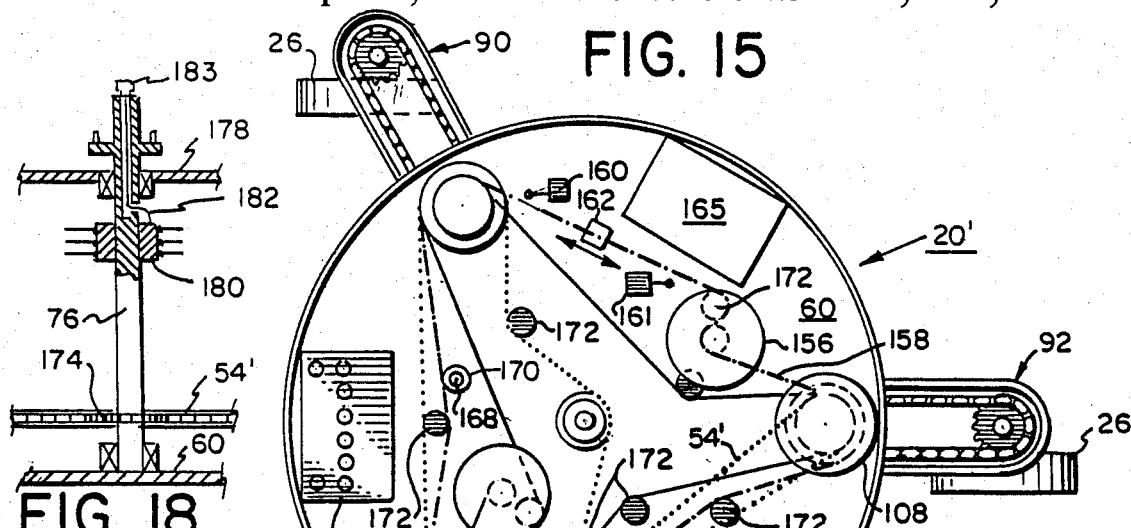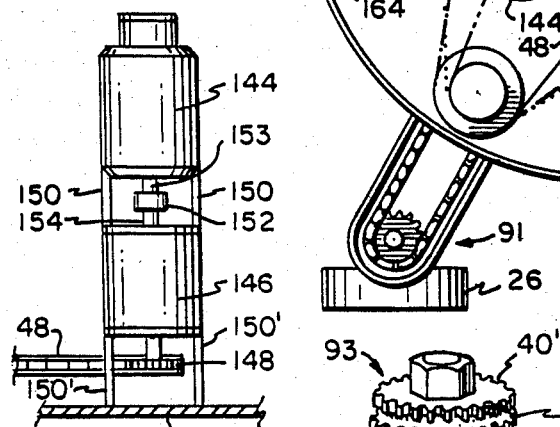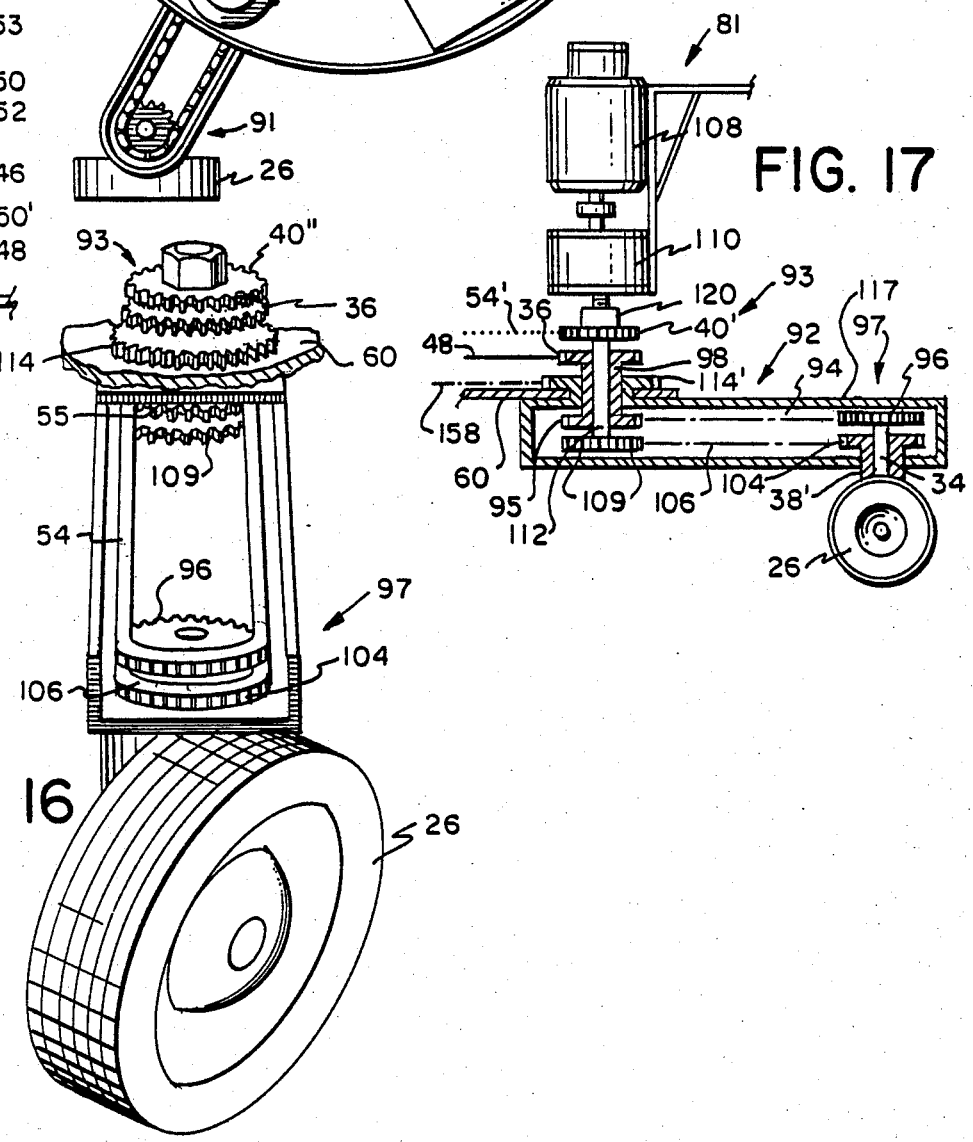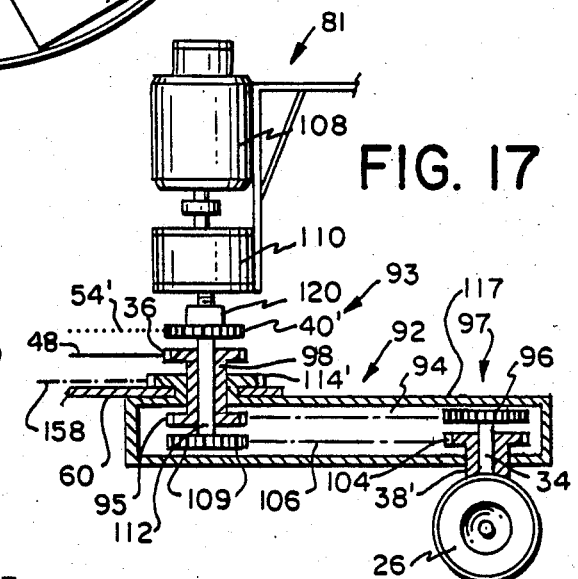

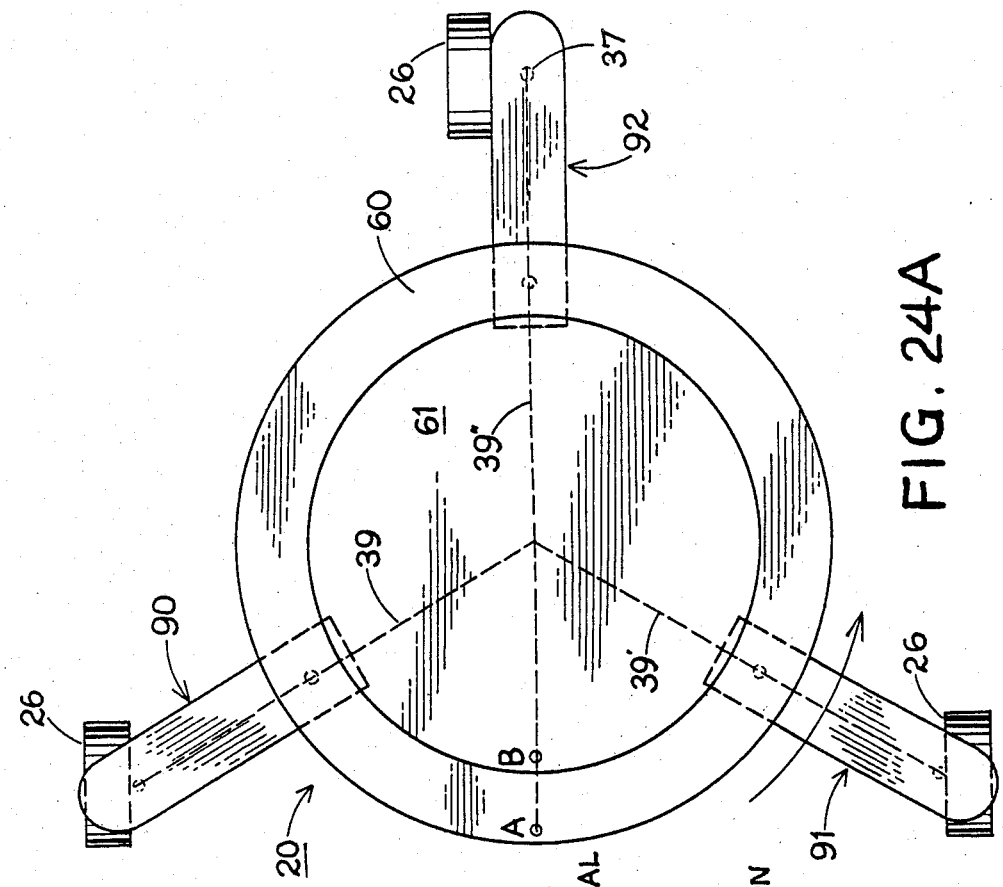
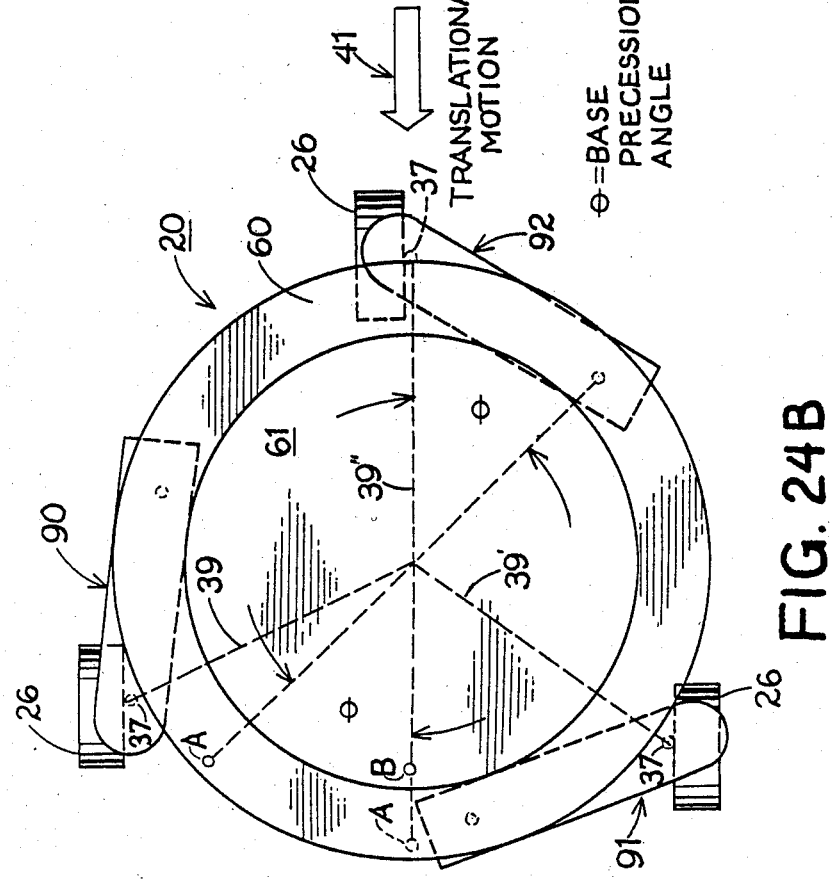
FIG. 24A
FIG. 24B
Θ = BASE PRECESSION ANGLE
RETRACTION WITH TRANSLATIONAL MOTION

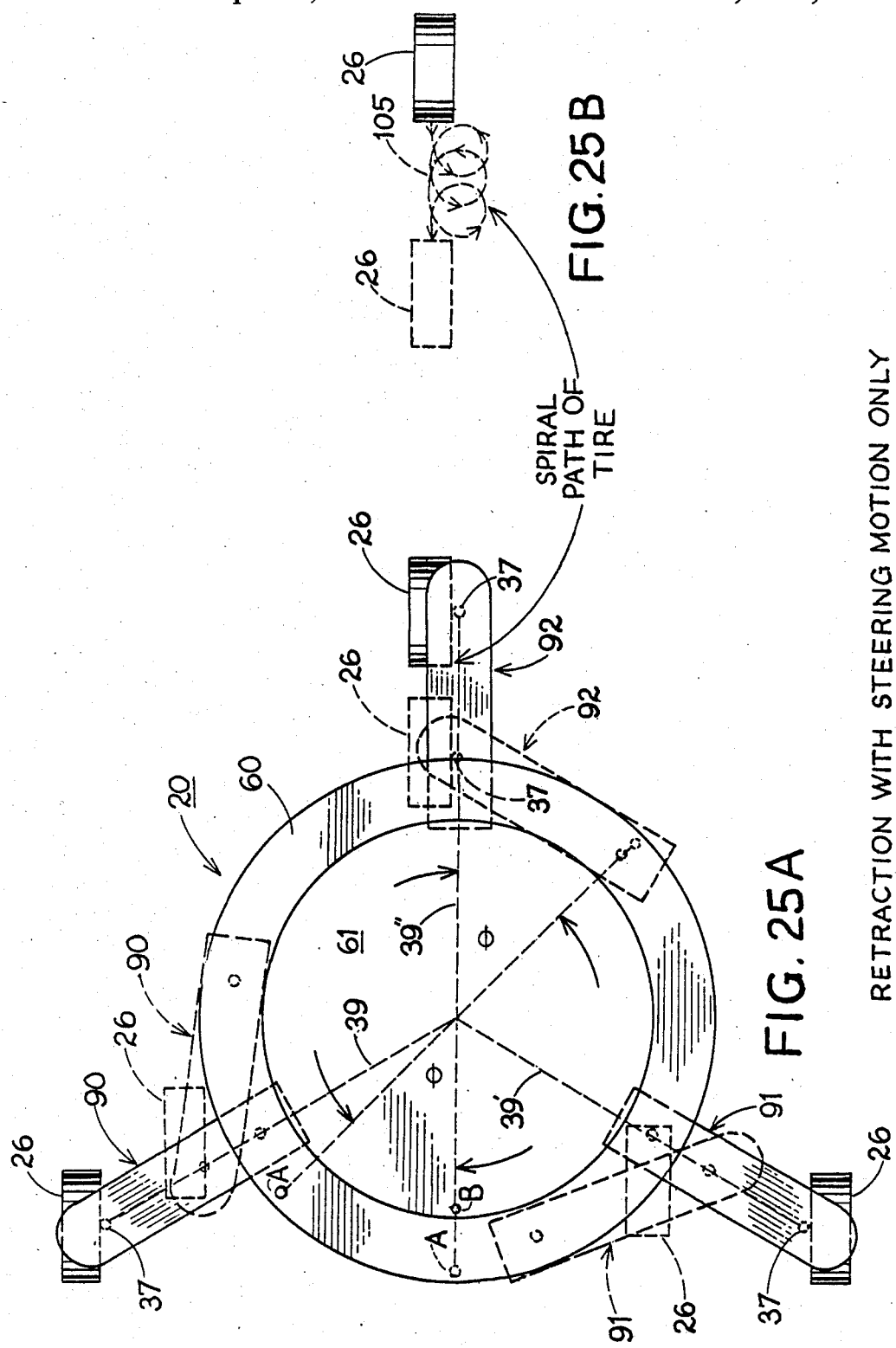

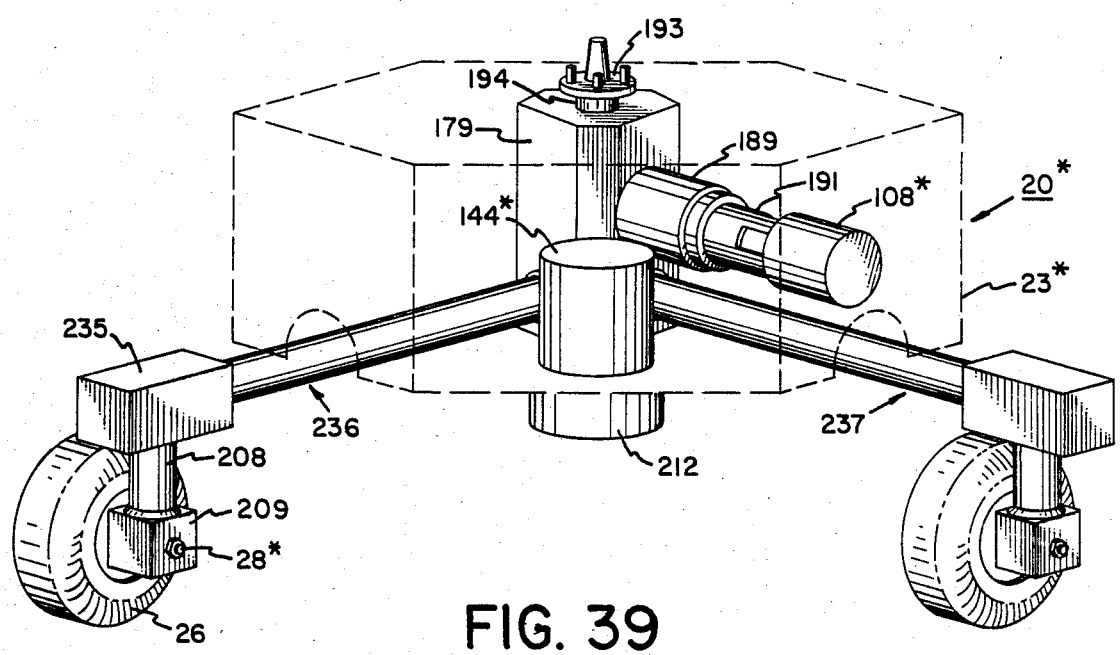
FIG. 39
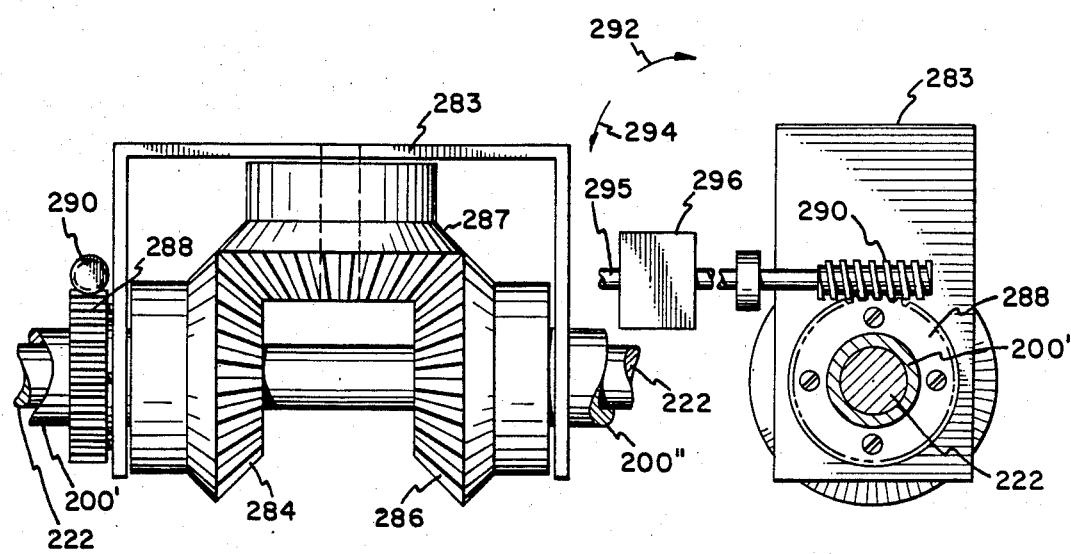
FIG. 35A
FIG. 35B

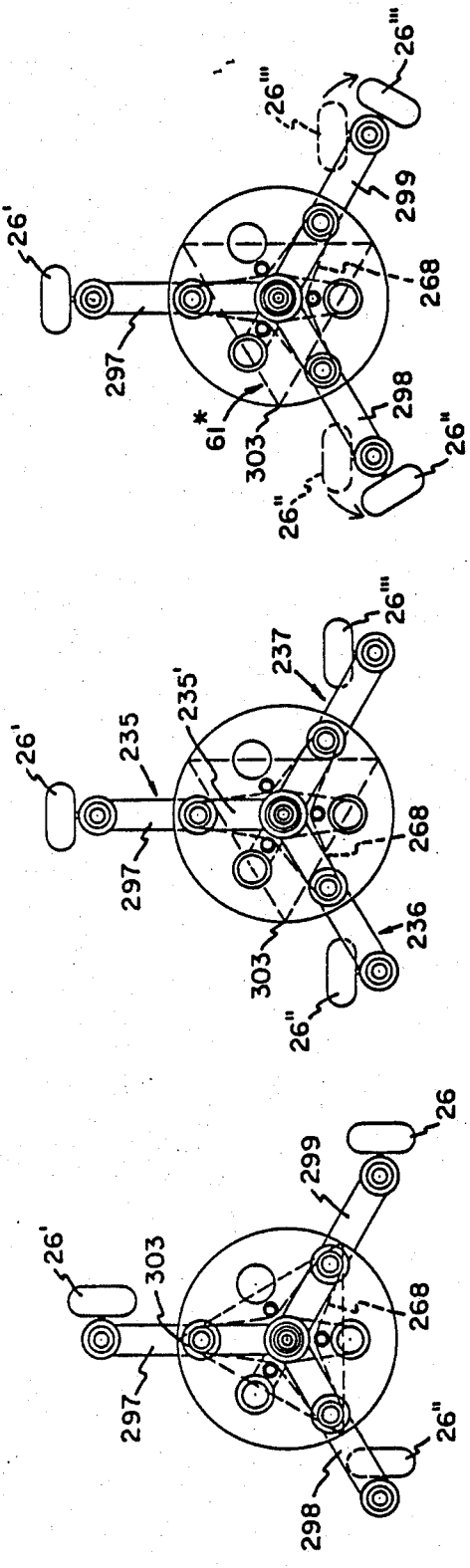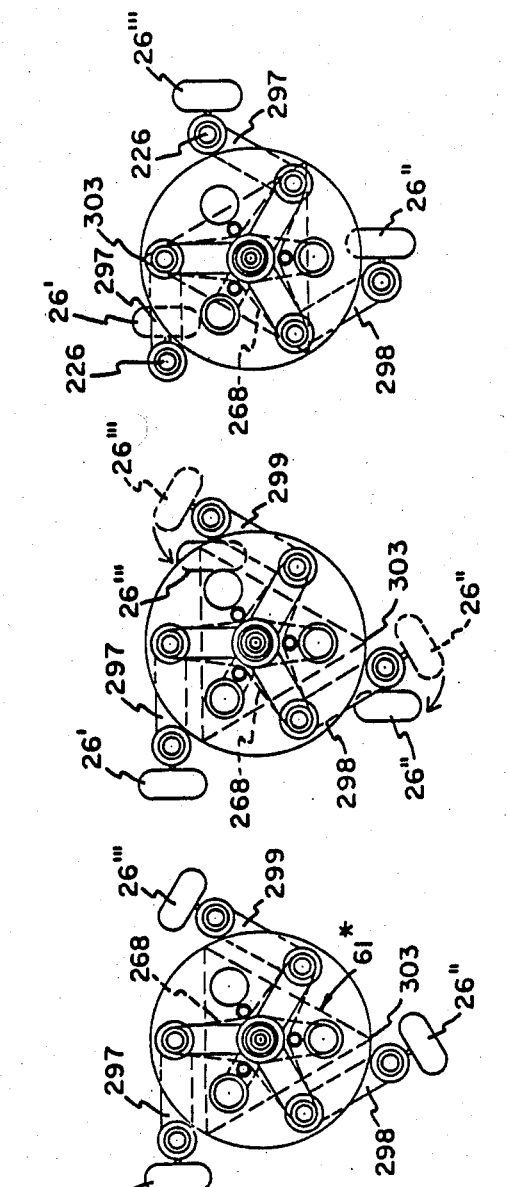

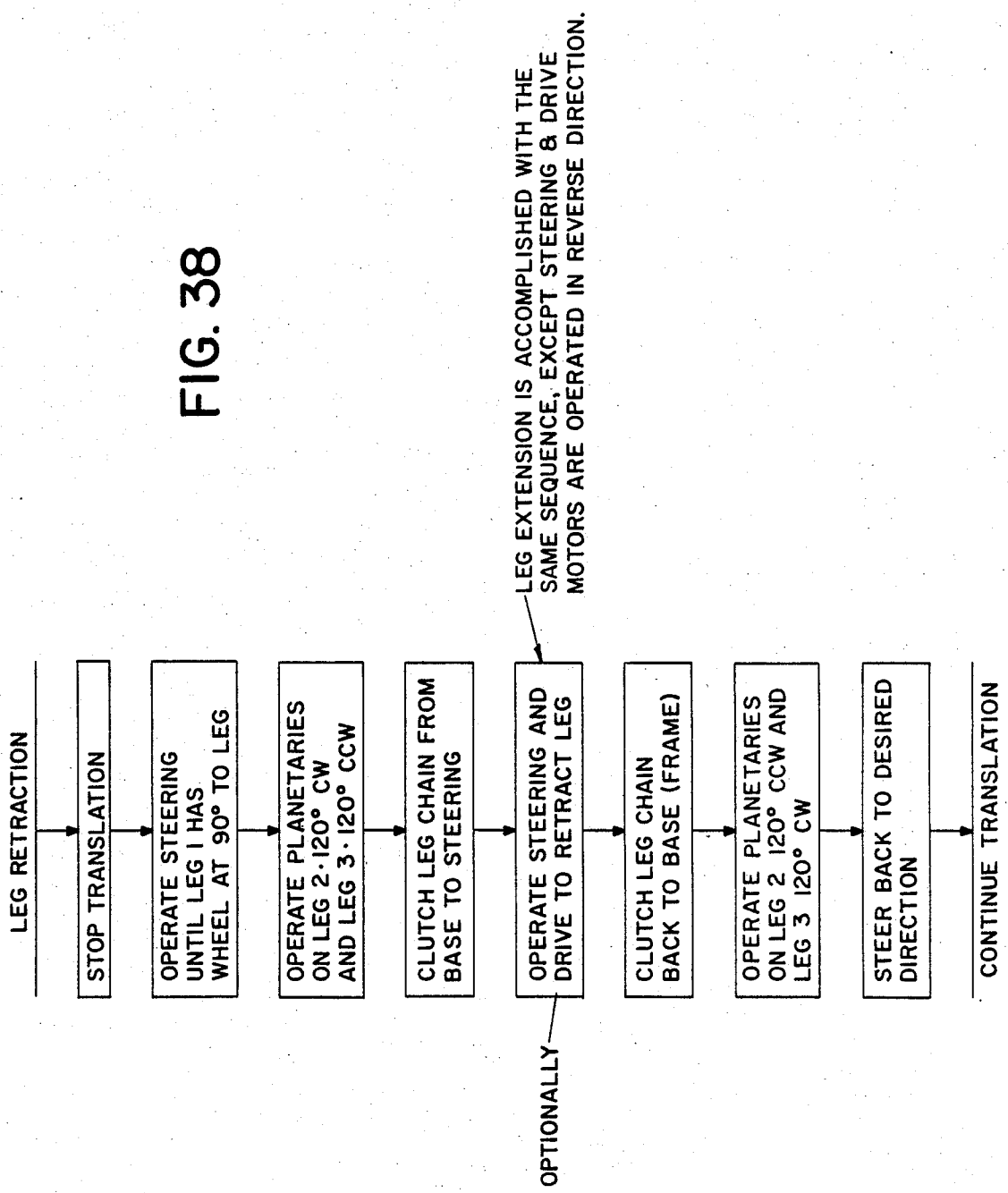

CONCENTRIC SHAFT MOBILE BASE FOR ROBOTS AND THE LIKE

CROSS REFERENCE TO RELATED APPLICATION

The present application is a continuation-in-part application of U.S. patent application Ser. No. 535,168, filed July 23, 1983, now U.S. Pat. No. 4,573,548, issued Mar. 4, 1986.

TECHNICAL FIELD

The present invention is directed to mobile bases (also called carriage systems) used to form mobile platforms upon which robots or other manipulative, observational, or monitoring devices may be placed so as to allow these devices to be independently moved along a surface.

BACKGROUND ART

Mobile bases for use with and forming part of robots and the like allow such devices to operate along relatively planar surfaces, such as a floor of an industrial facility. Such mobile robots are commonly used in industrial applications for transporting products from one location to another as well as aiding in the retooling of machines, including grinding and milling machines and fixed robots, the latter commonly referred to as pick-and-place robots. Mobile bases also have potential application in the fabrication of integrated circuit chips (especially very large scale integration chips—VLSI) where ultra-clean environments necessitate minimal human presence.

Indeed, in most modern factory installations, there is a need for an integration of mobile robots with pick-and-place robots in order to achieve a high degree of productivity. Such mobile robots may be highly intelligent devices incorporating central computers to allow the devices to perform such decisional tasks as avoidance of obstacles, the manipulation of objects with respect to loading and unloading areas, and radio communication control with central computers so as to receive and execute tasks as designated to them from the central computer. It is important that the mobile robot, sometimes referred to as X-Y conveyors (a name which has been given to them by the Sumitomo Machinery Corp. of America of Teterboro, N.J.), be capable of maneuvering in relatively close quarters over surface irregularities and changes in the slope of a floor as may be encountered by ramps used in factories. It is also important that such mobile bases be capable of moving on slick surfaces such as caused by oil spillages and grease.

Thus, the mobile base for use with robots must be a versatile device capable of movement in any planar direction. It must also be able to maneuver in and around obstacles and surface irregularities without falling over. This latter problem is complicated by the fact that objects lifted by a mobile robot tend to change the center of gravity of the robot and effectively make the mobile robot less stable than it otherwise would be. It is therefore necessary that the mobile base or carriage system used for a mobile robot be capable of adapting itself to such changes in the center of gravity of the robot-load combination and thereby effectively and safely transport an object from one location to another.

Some of the factors that have been considered in the design of mobile bases include: (1) the overall efficiency of the mobile base in terms of the length of time that it can operate before it requires recharging or refueling; (2) the ability of the mobile base to negotiate surface discontinuities; (3) the maximum grade that can be safely ascended or descended by a mobile robot when the mobile robot is either in a load or no-load condition; (4) the ability of a mobile robot to operate when the floor surface is coated with grease, oil, mud, snow, or other slideinducing material; (5) the ability of a mobile robot to operate on surfaces which are not "hard"; such as carpets, lawns, linoleum, and the like, as well as considerations as to whether the mobile base will damage or mar such surfaces; (6) the maximum load that the mobile robot is designed to carry; (7) the minimum passage width (such as a door) through which the mobile base must be able to pass; (8) the maximum speed and acceleration required of the mobile base; (9) whether the mobile base must operate without exhaust and whether noise limits are present; (10) the temperature and humidity range in which the mobile robot is to operate; (11) the maximum vibration the mobile robot is to encounter; (12) other environmental factors which may affect the operation of the mobile robot; and (13) the cost and reliability of the mobile base.

The prior art has approached the implementation of mobile bases from several design philosophies, one of which is the tricycle carriage system shown in FIGS. 2A and 2B. In FIGS. 2A and 2B, the carriage system uses two independent drive motors to respectively power and steer the robot. The driven wheels are fixed parallel to each other, while the third wheel is free to pivot. Steering is accomplished by causing one of the driven wheels to rotate faster than the other. This allows relatively tight turns to be accomplished by powering one wheel in a forward direction and the other in a reverse direction.

A primary problem with this configuration is that steering can be erratic due to differences in traction and/or efficiency between the two driven wheels. This can be partially corrected by placing an angular position encoder on the pivot wheel to help sense the rate of turning. If a pivot encoder is used, care is generally required during reverse movement or differential pivots. Alternatively, a computer can be used to provide tight control of the speed to the drive motors. This can be accomplished through use of tachometers to each drive motor or by using synchronous motors such as brushless rare earth motors and/or stepping motors. Representative of such carriage systems are those manufactured by R.B. Robotics Corporation, of 14618 West 6th Avenue, Suite 201, Golden, Colo. 80401.

Another variation of the tricycle carriage system powers only the pivot wheel while the other two wheels freely rotate. In this variation, steering is accomplished by a gear motor coupled to control the direction of the powered pivot wheel. This alternative is generally less expensive than the first mentioned dual-driven wheel variation and allows simpler steering control. The traction of this latter system, however, is less than that for the dual-driven version.

As will be discussed further in this description, carriage systems should be highly stable if they are to operate safely in an industrial environment. In particular, it is important that they not only be able to maneuver along a factory floor or the like but also that they be able to do so without falling over due to changes in direction, speed or floor tilting. Important considerations must therefore be made with respect to determination of the center of gravity, both in the unloaded and loaded configurations of the overall mobile robot. This in turn involves calculation of dynamic turning forces to ensure that not only is the mobile robot stable when loaded, but that it will remain stable even when acceleration forces associated with turning or changing of speed are encountered separately or simultaneously with respect to each other.

Another prior art carriage system that uses a triangle principle has been developed by the United States Veterans Administration as a transport device for paraplegic people, called the Omnichair ™. This carriage system is described in a publication entitled "Microcomputer Controlled OmniDirectional Mechanism for Wheelchairs" by W. H. T. La, T. A. Koogle, D. L. Jaffee, and L. J. Leifer, Institute of Electrical and Electronic Engineers (IEEE), *Frontiers of Engineering in Health Care.* CH1621-2/81/0000-0326,1981. This technique uses what is known as a "wheel within a wheel" with rollers positioned about the periphery of each of the three main wheels. One such main wheel is shown in FIG. 3A and three such wheels are shown in FIG. 3B as attached to the chair base. The chair can be turned by driving all three wheels together, and can be translated by driving two of the three wheels. This latter situation is shown via force vectors in FIG. 3C.

The present invention approaches a mobile base design from a different perspective; namely, a technique which uses a plurality of wheels, each generally oriented in the same direction at the same time and each allowed to change its direction under the unified control of a steering mechanism. Drive to each wheel is also simultaneously directed to the wheels by means of a separate drive motor. In this way, only one drive motor and one steering motor are required in order to achieve a mobile carriage system operable in any direction. The present invention provides transfer of steering and drive torque from the respective motor to the wheel assemblies and wheels, respectively, by means of concentric shafts and associated gears.

An enhanced version of this mobile base further includes an extensible leg assembly for each wheel with the respective wheel assembly mounted at the end of the leg assembly. In one embodiment of the invention, the leg assemblies are unifiedly controlled by a single motor driving a chain which controls the pivoting of each leg about the base. Through use of planetary gears in two of the leg assemblies, the wheel orientations can be controlled so as to allow retraction or extension of the leg assemblies while the mobile base is at rest in a manner that does not pirouette the wheels. Such retraction and extension minimizes the forces exerted on the leg assemblies as well as between the wheels and the floor surface. The leg assemblies can also retract or extend while the mobile base is in translation while maintaining the wheels in their translational orientation. Such extensible leg assemblies greatly simplify the use of the mobile base as it approaches or leaves narrow passageways and the like.

Furthermore, through use of a single motor for the steering and driving functions, a higher degree of efficiency is attained than in other prior art devices. This efficiency is markedly better than prior art mobile bases which turn the entire base in order to make a turn. In the present invention, only the wheels and turret associated with the mobile base turn while the remainder of the mobile base does not turn, thereby greatly reducing the energy required to make turns. This energy saving is especially important in warehouse and other applications requiring turns to be made frequently.

In addition to the prior art noted above, a number of prior art patents are known which are relevant to the present invention. These references are presented in Table 1 below.

TABLE 1

|  | Inventor | Issue Date |
|---|---|---|
| U.S. Pat. No. | | |
| 2,994,392 | Kosman | 1961 |
| 3,090,516 | Seymour, et al | 1963 |
| 3,134,455 | Fiorentini | 1964 |
| 3,306,390 | Jamme | 1967 |
| 3,572,458 | Tax | 1971 |
| 3,642,088 | Smith | 1972 |
| 3,825,087 | Wilson | 1974 |
| 3,920,093 | Moran, et al | |
| 3,938,608 | Folco-Zambelli | 1976 |
| 3,972,379 | Norris | 1976 |
| 4,274,503 | Mackintosh | 1981 |
| Foreign References | | |
| West Germany 2735071 | Thale | 1979 |
| The Netherlands 6609100 | Klockner-Werke AG | 1967 |

U.S. Pat. No. 2,994,392, Kosman, discloses a combined steering and drive unit for tractor wheels which is best illustrated in FIG. 4 thereof. Although a concentric shaft is used in the wheel assembly, the steering and transfer of drive power to the wheels except for the short wheel assembly is not performed with concentric shafts. Furthermore, the emanating source of the drive and steering power is not centrally located as in the present invention. This reference also neither discloses nor suggests extensible leg assemblies as disclosed and claimed herein.

U.S. Pat. No. 3,090,516, Seymour, et al, discloses a panel handling and transporting machine which uses a plurality of chains for both steering and driving the wheels of the machines. The use of concentric shafts for steering with each leg assembly wherein the power to the steering and drive gears of each leg assembly are centrally located is neither disclosed nor suggested in this reference. This reference does not disclose or suggest extensible leg assemblies.

U.S. Pat. No. 3,134,455, Fiorentini, discloses a universal truck with steering and driving wheels which uses a chain 14 overlying gears 13 and 13' so as to steer the associated wheels 15. This reference does not disclose the use of concentric shafts associated with a plurality of leg assemblies with the input power sources to the leg assembly drive and steering gears each coming from a single mechanically interconnecting source. Furthermore, this reference does not disclose or suggest extensible leg assemblies as disclosed herein.

U.S. Pat. No. 3,306,390, Jamme, shows a four-wheel-driven-and-steered vehicle. This vehicle is preferably disclosed as a tractor with corresponding wheel gage adjusting means incorporated. This reference also does not disclose the use of a plurality of concentric shafts and associated leg assemblies as disclosed and claimed herein. It also does not disclose or suggest the use of extensible leg assemblies.

U.S. Pat. No. 3,572,458, Tax, discloses an all-wheel steering system for a heavy vehicle (e.g., a crane) using individual servo motors for turning each wheel. This reference does not disclose or suggest the use of concentric shafts for steering and drive power nor does it disclose or suggest simultaneously driving these shafts from central gears. Although extension arms are shown which can change the track of the wheels, the arms are unlike the extensible leg assemblies of the present invention.

U.S. Pat. No. 3,642,088, Smith, discloses a self-locating vertically and facing adjustable seat for use in tractors. Although the tractor has driven and steering wheels, this patent is of lesser relevance than the above cited references and does not disclose extensible leg assemblies nor the concentric shafts used to transfer power to drive and steer the wheels of the mobile base disclosed herein.

U.S. Pat. No. 3,825,087, Wilson, discloses a motorized agricultural type carrier in which all four wheels of the carrier can be selectively powered and steered. The steering mechanism shown is unlike the concentric shafts used in the present invention. This reference also does not disclose or suggest extensible leg assemblies and the particular mechanisms used by the present invention for such extension and retraction while the mobile base is not in translation.

U.S. Pat. No. 3,920,093, Moran, et al, shows an omnidirectionally steerable vehicle which has two steerable legs as illustrated in FIG. 1. The steerable legs are not separately driven as are the leg assemblies associated with the present invention and this reference does not disclose or suggest concentric shafts of any sort.

U.S. Pat. No. 3,938,608, Folco-Zambelli, discloses a wheeled vehicle having a guide and traction wheel 8 which turns as the body of the unit is turned with reference to its frame. This type of drive and steering mechanism is unlike the concentric shaft power transfer devices of the present invention. This reference also does not suggest the extensible leg assemblies disclosed in the present invention.

U.S. Pat. No. 3,972,379, Norris, discloses a hydrostatically driven utility vehicle where each wheel is separately driven and steered and where means are provided for steering any two wheels in unison. The steering is accomplished with rack and pinion gear assemblies, unlike the present invention, and no suggestion of concentric shaft power transfer devices or of extensible leg assemblies is made in this reference.

U.S. Pat. No. 4,274,503, Mackintosh discloses a power operated wheelchair having a drive motor 87 and a steering motor 43 as shown in FIG. 2 thereof. The steering motor drives a steering chain 77 which in turn controls the direction of six ground wheels 64 as best seen in FIGS. 3 and 7. The actual steering of each wheel is accomplished through direct turning of yoke 74 via shaft 73 and sprocket 76. This arrangement provides for changing the angular direction of each of the wheels simultaneously but does not provide for allowing the wheels to move about a short radius as a turn is effected at a stationary location as is done in the present invention. The present invention provides for actual rotation about each wheel's axle as a turn is generated so that the wheel does not shimmy along the surface upon which it is placed. The arrangement shown in Mackintosh does not provide for such rotation, and thus shimmying about the surface upon which the chair is placed will apparently occur if a turn is effected while the chair is not in translation. Such shimmying requires a great deal of energy, thus reducing battery recharging times and can result in marring of the floor surface as well as rapid wearing of the ground wheels 64.

Furthermore, the embodiment shown by Mackintosh includes six peripherally placed ground wheels which limit the amount of purchase, that is surface area, upon which the steering chain contacts sprockets 76 associated with the ground wheels. By having limited purchase, there is the likelihood of slippage between the steering chain and the sprockets, especially if a turn is attempted without translation of the chair which would result in high frictional forces between the ground wheel and the surface of the floor. The present invention typically employs three wheels and provides for rotation of these wheels about their axes when turns are performed, thereby minimizing frictional contact with the floor and reducing energy usage. The concentric shafts of the present invention in association with their terminating gears provide a positive, efficient and environmentally clean means of transferring steering and drive torque from the respective steering and drive motors to the wheels. The only chain used in any embodiment of the present invention is linked to extensible leg assemblies for extension and retraction. This chain is therefore only driven when extension or retraction of the leg assemblies is desired. Continuous or near-continuous movement of steering and drive chains is therefore eliminated. The purchase, stretching, resonant vibrational chain-sprocket jumping and sagging associated with drive and steer chains is therefore eliminated. Furthermore, Mackintosh does not even suggest the use of extensible leg assemblies.

German Pat. No. 27 35 071, Thale, shows in its drawings a mechanism for steering pairs of legs in the same direction at the same time with two pairs of legs being steered oppositely so as to allow the device to move in a smooth circle as shown in its FIG. 1. This technique for steering the wheels of the device is unlike the present invention although FIG. 3 does show a gear assembly for driving a single wheel which is similar in nature to the present invention. This reference also does not disclose concentric shaft power transfer devices nor extensible leg assemblies.

Finally, Netherlands Pat. No. 6609100, Klockner-Werke AG, shows a tricycle type power vehicle with apparent steering of front wheel 8. This type of vehicle does not disclose or suggest the mobile base of the present invention with uniformly driven and steered legs and extensible leg assemblies.

Therefore, it is submitted that the prior art references, taken alone or in combination with each other, do not disclose or suggest the mobile base of the present invention, including the embodiment using extensible leg assemblies. Copies of the patent references cited will be submitted to the Patent and Trademark Office.

DISCLOSURE OF THE INVENTION

A mobile base (carriage system) is described which preferably uses three wheels that are mechanically synchronized to each other for both steering and rotation. The preferred embodiments of the present invention obtain synchronization of both steering and axial rotation through use of concentric shafts. These shafts transfer power from the respective drive and steering motors to each wheel axle and wheel axle housing. Through this technique, the wheels steer together, and therefore the base of the mobile base maintains its rotational orientation as it executes a turn. Due to this mechanism, the upper torso of a robot placed upon the leg assemblies (which would typically contain a vision and ranging system or a television link for remote radio control) can be pivoted and mechanically linked to the steering motor. Very precise controlled turns of the mobile base can be accomplished by driving the steering shafts with an accurate servo motor and an associated gear reducer as will be explained in the detailed description. Since the mobile base leg assemblies do not turn when a change in direction is made, significant energy savings are realized as compared to carriage systems with steerable bases.

The axle or power shaft associated with each wheel assembly drives the axle emanating from the wheel by means of a pair or miter gears. In all embodiments of the present invention having extensible leg assemblies but without independently steerable wheels, it is preferable that the radius between the center of the axle and the wheel form a ratio with the radius of the wheel equal to that of the gear ratio of the miter gears and thereby cause the wheel to traverse a distance equal to the circumference of the steering circle (on the ground) when the axle is maintained in a stationary position with only the steering tube turned through 360°. This preferable radius ratio minimizes wobble of the carriage system when a change in direction is made while the mobile base is stationary.

Another embodiment of the present invention also incorporates extensible leg assemblies associated with each foot assembly with a retraction chain connected to each leg assembly. In this embodiment the wheel of a reference leg assembly is turned by the steering motor so as to be approximately perpendicular to the leg assembly. The non-perpendicular relationship of the two remaining wheels to their respective leg assembly is corrected by equal but opposite movement of planetary gear yokes associated with these two leg assemblies. Once the wheels are so aligned, the retraction chain can extend or retract the leg assemblies provided the steering motor compensates the steering of each wheel as the respective leg assembly traverses its approximately 90° arc. This can be accomplished by clutching the retraction chain to the steering action.

Alternatively, the retraction chain drive motor can be omitted with the wheel drive motor turning each wheel axle when so aligned provided that the steering motor is also energized to compensate for wheel misalignment as the leg assemblies move through their arcs or with the steering clutched from the steering motor at such times. Each leg assembly is simultaneously controlled by a chain which can provide for extension and retraction of each leg assembly simultaneously. In this manner, the carriage system can be moved through relatively narrow locations with the legs retracted while at other times the legs can be extended to provide additional stability, especially when the associated mobile robot is carrying a load which otherwise offsets the carriage system's center of gravity. This version of the present invention also incorporates concentric shafts for steering each wheel assembly and for driving each wheel. Extension and retraction can be performed with or without translation of the carriage system.

All embodiments of the invention which use concentric shafts employ gears mounted to the shafts so as to minimize tolerance build-up which would otherwise result if the gears were fixed to the shafts about the shafts' longitudinal axes. By providing longitudinal axial movement of these gears, assembly of the mobile base is greatly facilitated.

OBJECTS OF THE INVENTION

It is therefore a principal object of the present invention to provide a mobile base or carriage system for mobile robots and the like which provides for simultaneous driving and steering motion to each wheel associated with the mobile base wherein torque from the steering and drive motors is transferred to the wheel assemblies and wheels, respectively, through use of concentric shafts and associated gears.

Another object of the present invention is to provide a mobile base of the above description further comprising extensible leg assemblies associated with each wheel assembly so as to increase the zone of stability for the mobile base when the legs are extended outwardly.

A still further object of the present invention is to provide a mobile base of the above description with extensible leg assemblies having planetary gears with pivotable yokes so as to permit retraction or extension of the leg assemblies while the mobile base is stationary and whereby such retraction and extension does not require the wheels to pirouette or translate.

A still further object of the present invention is to provide a mobile base with extensible leg assemblies that maintain wheel orientation between retraction and extension when the carriage system is in translation.

Another object of the present invention is to provide a carriage system that does not revolve the carriage base in order to change direction, thereby increasing the efficiency of the carriage system as compared to systems that rotate the carriage base to make turns.

A further object of the present invention is to provide longitudinal axial movement of the gears connected to the concentric shafts so as to minimize tolerance build-up.

Other objects of the present invention will in part be obvious and will in part appear hereinafter.

THE DRAWINGS

For a fuller understanding of the nature and objects of the present invention reference should be made to the following detailed description taken in connection with the accompanying drawings, in which:

FIG. 2A is a diagrammatic top plan view of a prior art mobile base showing placement of its wheels and its normal center of gravity (NCG);

FIG. 2B is a diagrammatic side elevational view of the mobile base shown in FIG. 2A;

FIG. 3A is an enlarged side elevational view of a wheel assembly used in another prior art mobile base, the wheel assembly having rollers placed about the periphery of a hub so as to form an overall wheel;

FIG. 3B is a diagrammatic top plan view of a mobile base using the wheels shown in FIG. 3A;

FIG. 3C is a force diagram showing how a resultant movement in the forward ($F_Y$) direction can be obtained by simultaneous rotation of the wheels associated with motors 2 and 3 in FIG. 3B;

FIG. 15 is a top plan view of the mobile base in a second embodiment of the present invention having extensible leg assemblies such as shown in FIG. 1, illustrating the placement of the steering motor, drive motor, and retraction motor associated with this mobile base as well as placement of the chains, idlers, potentiometer, micro-switches and batteries;

FIG. 16 is an enlarged partially broken away perspective view of a leg assembly used in the mobile base shown in FIG. 15;

FIG. 17 is a cross-sectional diagrammatic view of the leg assembly driven by the steering motor shown in FIG. 16;

FIG. 18 is a side, partially cross-sectional view of the center shaft shown in FIG. 15, illustrating how electrical power and communication information is transferred between the components on the carriage system base to the upper torso of a robot placed upon the carriage system as shown in FIG. 1;

FIG. 19 is an enlarged side elevational view of the drive motor and gear box shown in FIG. 15;

FIG. 24A is a diagrammatic top plan view of the mobile base and turret with the leg assemblies in their extended position and showing the rotational direction of retraction with the mobile base in translation;

FIG. 24B is a diagrammatic top plan view similar to FIG. 24A showing the leg assemblies retracted and illustrating rotational movement of the base and alignment of the turret and wheels corresponding to their preretraction orientation;

FIG. 25A is a diagrammatic top plan view of the mobile base and turret similar to that shown in FIGS. 24A and 24B, illustrating the wheel, base and turret orientations when the leg assemblies are fully extended and fully retracted while the mobile base is not in translation;

FIG. 25B is a diagrammatic representation of the path of any wheel as a leg retraction is performed without the mobile base in translation, thus corresponding to the paths of the wheels shown in FIG. 25A;

FIG. 33 is a side cross-sectional view of one extensible leg assembly shown in FIG. 32, illustrating transmission of drive power to the wheel, steering power to the wheel assembly, as well as extension and retraction of the leg member through use of an associated motor;

FIGS. 36A-36G are a series of diagrammatic representations of the mobile base shown in FIG. 32 illustrating the orientation of the wheels, leg assemblies, carriage base, and turret while the leg members are retracted during non-translational movement of the mobile base;

FIG. 38 is a flow chart for non-translational leg retraction.

FIG. 39 is a perspective view of a mobile base similar to FIG. 26, but showing non-retractable leg assemblies that extend beyond the system's base.

BEST MODE FOR CARRYING OUT THE INVENTION

Figure 4:
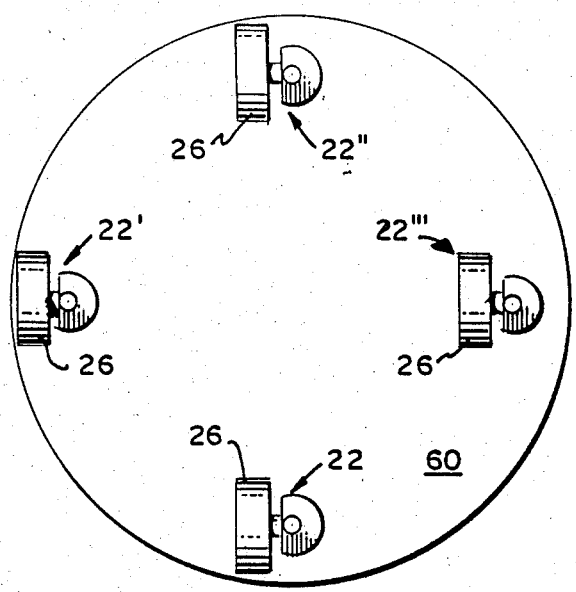
FIG. 4 is a bottom plan view of the base and wheels of a first embodiment of the present invention.
Figure 5:
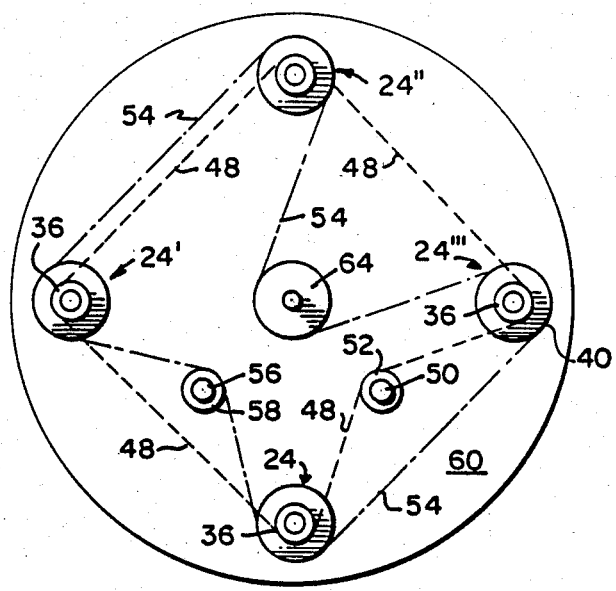
FIG. 5 is a top plan view of the carriage system base shown in FIG. 4.
Figure 6:
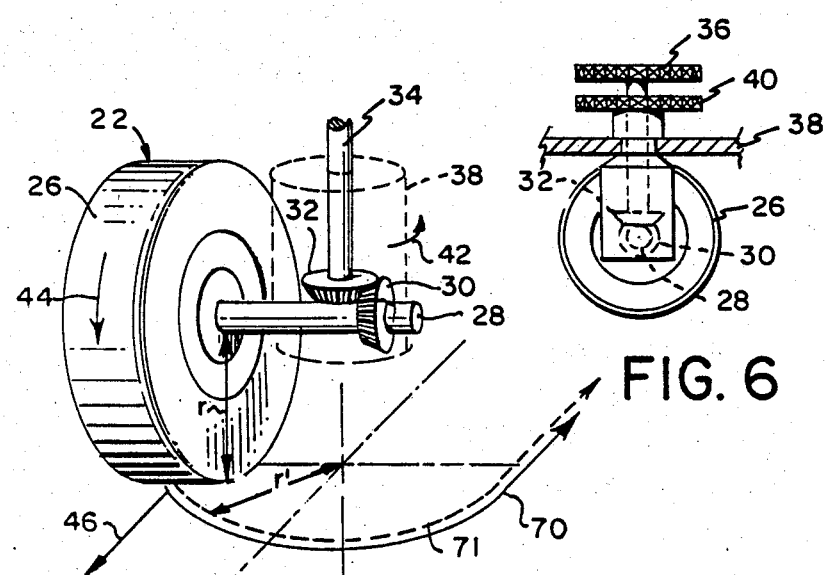
FIG. 6 is an enlarged partial cross-sectional view of the wheel assembly used in the mobile base shown in FIGS. 4 and 5.
Figure 7:
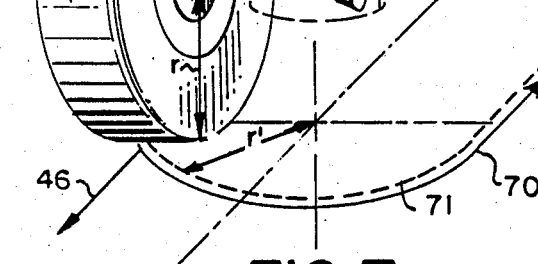
FIG. 7 is an enlarged perspective view of the wheel assembly shown in FIG. 6 illustrating how a wheel rotates about its axis as the wheel changes direction.

As best seen in FIGS. 4 and 5, a synchro-drive mobile base 20 (carriage system and mobile base are used synonymously) comprises a plurality of foot assemblies 22, 22', 22" and 22''', each including a wheel 26, an axle 28, miter gears 30 and 32, a power shaft 34, a power shaft sprocket 36, a steering tube or housing 38, and a steering tube sprocket 40. As can be seen in FIGS. 5, 6 and 7, rotation of power shaft 34, such as in the direction of arrow 42, causes rotation of miter gear 32 which in turn imparts rotation to miter gear 30 turning axis 28 so as to rotate wheel 26 in the direction of arrow 44. Translation of the wheel, if steering tube 38 is maintained in a stationary position, is then in the direction of arrow 46. As seen in FIG. 4, a chain 48 is positioned about each power shaft sprocket 36 so that each wheel is simultaneously driven in the same direction upon movement of chain 48 by drive motor shaft 50 and its associated drive sprocket 52. A motor (not shown) turns the shaft 50. The motor is supplied with electrical power, typically from a battery mounted within the carriage system.

The orientation of each wheel 26 is similarly controlled by movement of steering chain 54 which is positioned about each of the steering sprockets 40. The chain is driven by a steering motor shaft 56 and its associated steering motor sprocket 58. Since each steering sprocket 40 receives the same angular displacement for a given movement of steering chain 54, the orientation of each wheel on the carriage system is maintained since the wheels are all installed in the same orientation. Therefore, any desired change in direction can be achieved by simply controlling the angular rotation of the steering motor shaft 52.

Figure 8:
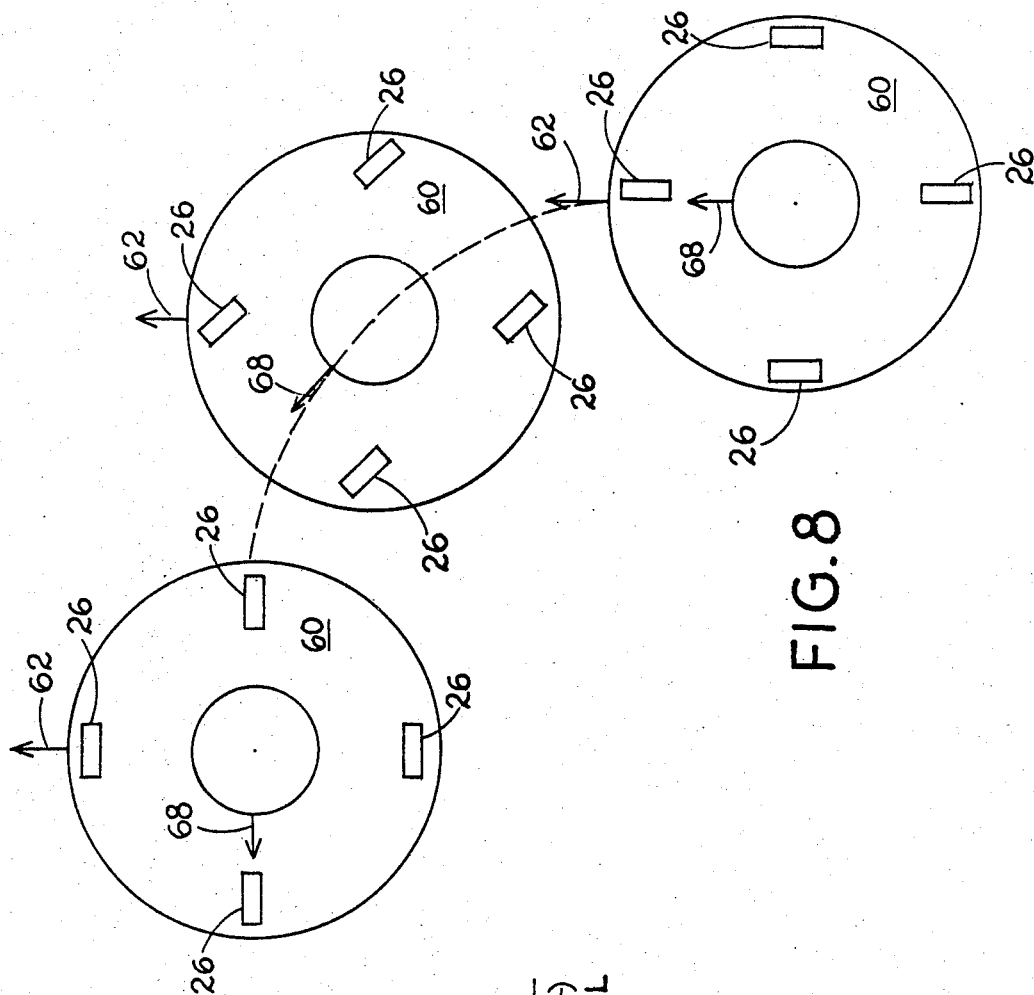
FIG. 8 is a series of diagrammatic representations of the mobile base shown in FIGS. 4 and 5 illustrating the orientation of the wheels and of the base and turret associated with the mobile base as a turn is made.

Since the wheels of the mobile base steer in synchronism, base 60 of the mobile base does not change its rotational orientation with respect to the surface upon which it is placed as the mobile base executes a turn. This is shown diagrammatically in FIG. 8 as the carriage system makes a 90° turn in the counter-clockwise direction as viewed from above. Orientation arrow 62 shows that the carriage system has indeed maintained its orientation with respect to the surface upon which it is placed as this turn is executed.

Because of this characteristic of the carriage system, the upper torso 61 of a robot (see FIG. 1) placed upon the carriage system can be pivoted and thus mechanically linked to the steering chain 54 by means of torso rotation sprocket 64 interconnected to the steering chain 54 as shown in FIG. 5. The sprocket thus imparts rotation to the torso shaft 66 thereby providing that the torso orientation as depicted by arrow 68 in FIG. 8 rotates as the carriage system undergoes a rotational change. This allows the vision and ranging systems 63 (see FIG. 1) which are normally associated with the upper torso of the robot to be directed to the instantaneous direction of the carriage system. By not rotating the carriage system base 60 as a turn is executed, a considerable amount of energy is saved due to the rotational inertia of the base. Typically the carriage system base and components (including batteries) can weigh over 200 pounds (90.71 kilograms) and by not rotating this mass as a turn is made, rotational energy is conserved. Such energy conservation is especially important when the carriage system is used in a warehouse or other application requiring many turns.

As best seen in FIG. 7, miter gear 30 is positioned on the opposite side of power shaft 34 with respect to wheel 26. This placement of the miter gear is due to the interplay between the steering and the wheel drives. If the power chain 48 is stationary (that is, the carriage system is not moving) and if the steering chain 54 is turned by driven sprocket 58, the steering chain causes the wheels 26 to roll without slippage as the wheels move once around center line path 71 if the gear ratio for gears 32 and 30 is in the same ratio as the wheel radius r and inner path pivot radius r'. This is mathematically stated as:

$$\text{gear ratio } A/B = r'/r$$

where A is the number of teeth on gear 32 and B is the number of teeth on gear 30.

If the pivot radius r' is less than the wheel radius r, the carriage base will undulate slightly as such a steering operation is performed. If this is objectionable in a particular installation, the miter gears 30 and 32 can be selected to have a ratio equal to the ratio of the circumferences of the two circles associated with radii r and r'. In the preferred embodiment of the present invention, gear ratio $A/B = 1$ and thus the radius of wheel 26 is selected to be the same as inner path radius r'.

This wheel assembly arrangement is different from the yoke arrangement disclosed in U.S. Pat. No. 4,274,503, Makintosh. There, although the wheels are steered in unison, they each pivot at one location on the floor surface if the carriage system is not in translation as a turn is executed. Such turning without wheel rotation can easily mar a floor surface and increase the wear of the wheels. The present invention obviates this problem in the prior art. The present invention also uses much less energy to make such a turn as compared to Mackintosh since friction with the floor surface is greatly reduced by the wheel rotation.

In order to ensure that the drive chain 48 and the steering chain 54 have enough contact with their associated drive and steering gear sprockets 40 and 36 respectively (such a contact area between a gear and a chain is known in the art as "purchase"), idlers can be incorporated to force the chain to form a more acute angle with the associated sprocket. This will be described more fully with respect to an enhanced embodiment of the present invention presented below.

The carriage system shown in FIGS. 4-7 has been found to be exceedingly simple to control, to have fairly good efficiency with respect to motive power consumption, has relatively good traction, has excellent maneuverability, excellent navigation, but has only fair stability and climbing ability due to the wheels being non-projected with respect to the base 60.

The reason for desiring greater stability for a carriage system than that embodied in the above version of the present invention can best be understood following a review of the carriage system stability as presented in the next section.

Stability of a Carriage System

In order to determine the stability of a carriage system with an associated robot thereon, it is necessary to determine the composite center of gravity for the carriage system and robot. The center of gravity (technically referred to as the center of mass) is in essence the location where an object can be balanced at a point. Mathematically, it can be defined by a vector R emanating from the origin of a reference frame whose magnitude and direction are given by the equation:

$$\vec{R} = \sum_{i=1}^{N} (m_i \vec{r}_i)/M$$

for a group of particles, of total mass M; and by $$\vec{R} = \frac{\vec{r}\, dm}{dm}$$

for a solid homogeneous object of total mass M. (See *Classical Mechanics*, Goldstein, p. 5, Second Printing, July 1981, Addison-Wesley Publishing Co. Inc.).

The vertical component of the center of gravity is merely the height of this balance point, while the "normal center of gravity" (sometimes abbreviated NCG) is the projection of this point onto a surface upon which the object is placed. Various mathematical techniques can be used for determining the center of gravity, including its vertical component and its normal component. One computer program which performs such calculations is identified as CG.BAS, a program by written by applicant in the C-BASIC ™ language (Digital Research Inc.) for use on computers operating under the CP/M ® operating system (CP/M is a registered trademark of Digital Research, Inc., Pacific Grove, Calif. 93950.)

The determination of overall stability in addition to requiring knowledge of the carriage system-robot combination center of gravity also requires knowledge of both the static and dynamic stability. A computer program that makes such determinations is presented at pages 259-262 of *Basic Robotics Concepts* and is also hereby incorporated by reference.

Figure 9:
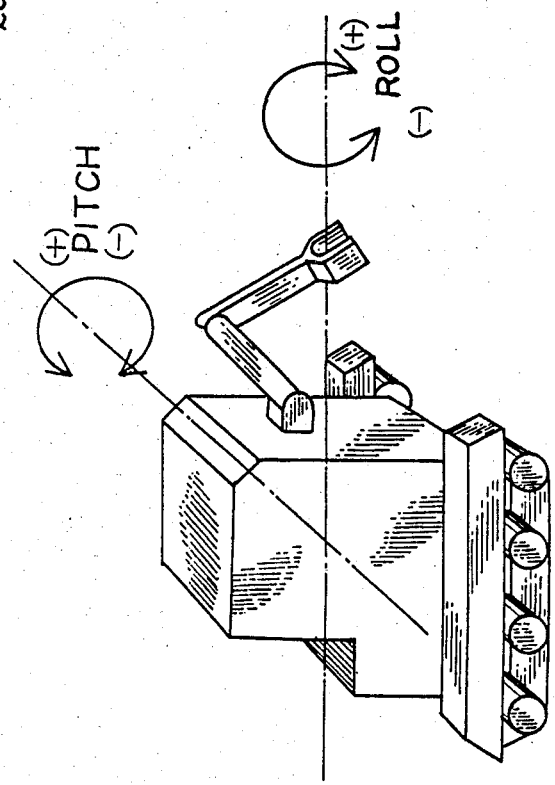
FIG. 9 is a perspective diagrammatic representation of a mobile robot used to define roll and pitch.

In the following discussions the term "pitch" is used to describe the angle of deviation from level along the axis of motion as best seen in FIG. 9, while the term "roll" describes the angle of tilt relative to level in a plane normal to the direction of motion. Positive pitch is defined as a "nose-up" attitude, while positive roll is described as a tilt to the left with respect to the forward direction of the carriage system.

Figure 10A:
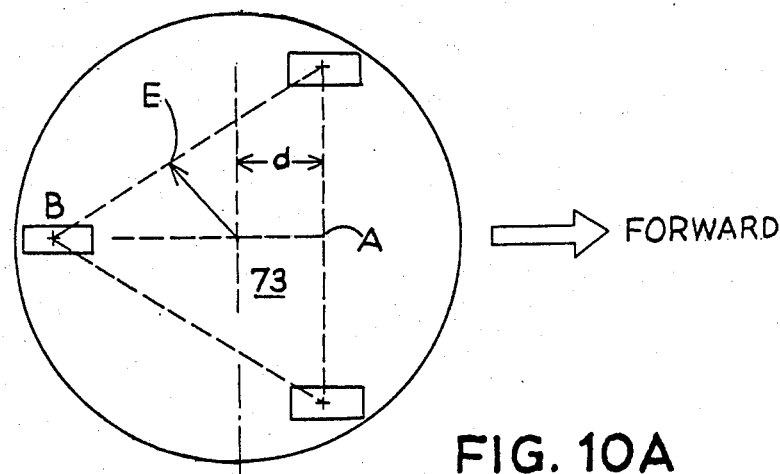
FIG. 10A is a diagrammatic top plan view of a carriage system base illustrating the zone of stability and the direction where tipping can most easily occur with respect to the carriage system.

In determining the static stability of a carriage system or any other object, reference is usually made to what is called the "zone of stability" as shown diagrammatically in FIG. 10A. The zone of stability 73 is simply the area bounded by lines drawn between the support points which, for carriage systems, are typically the wheels at the point they contact the floor or ground. It is usually desirable to arrange for heavier components of the carriage system (such as motors, batteries and gear boxes) so that their combined center of gravity is directly over the center of the zone of stability.

Figure 10B:
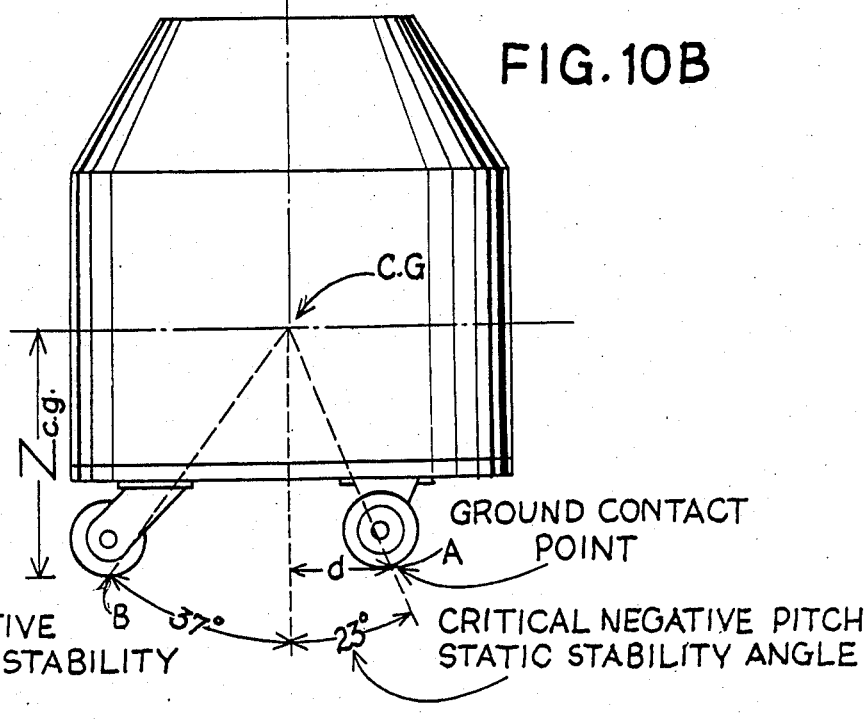
FIG. 10B is a side elevational view of a typical mobile base illustrating the positive and negative static stability angles.

Once the zone of stability and location of the center of gravity are determined, the "critical static pitch angles" can be determined by drawing a line from the center of gravity straight forward and backward to the intersection with the edge of the zone of stability. This is shown by points A and B in FIG. 10A. The critical static pitch angles can be determined graphically as shown in FIG. 10B or through use of the following equation:

$$\theta = \arctan(d/Z_{cg})$$

where
$\theta$ is the critical stability angle
$Z_{cg}$ is the height of the center of gravity
d is the distance (in the direction of interest) from the normal center of gravity (NCG) to the edge of the zone of stability.

The critical static positive pitch angle is the maximum incline that the carriage system-robot combination can stand on without tipping over backwards. Conversely, the critical static negative pitch angle is the maximum slope that the carriage system-robot can stand on facing downward without falling over. The same process can be used to find the critical static roll angles, taking the into account the worst case conditions for the number of wheels used. Thus, in a tricycle carriage system such as shown in FIGS. 10A and 10B, the worst case is when the carriage system-robot combination is represented by pitch and roll at the same time, caused by a slope in the direction of point E.

A carriage system-robot combination can drive up or down a ramp very nearly equal to its critical static pitch angle provided it remains at a constant speed. If, however, the mobile robot is driving down a steep ramp and attempts to slow down or conversely, to accelerate while climbing a steep ramp, it may still fall over even though the static pitch angle has not been exceeded. Due to this potential problem, the carriage system-robot combination should be stable at angles considerably worse than those that it is actually expected to negotiate.

The force that acts on an object such as a mobile robot is the result of longitudinal acceleration or deceleration as given by the following equation:

$$F = M^*a$$

where:
F is the resultant force (in pounds or Newtons),
M is the total mass of the mobile robot (in slugs or kilograms, where at sea level one slug equals an object's weight in pounds divided by 32) and
a is the acceleration in feet per second per second or meters per second per second.

Figure 11:
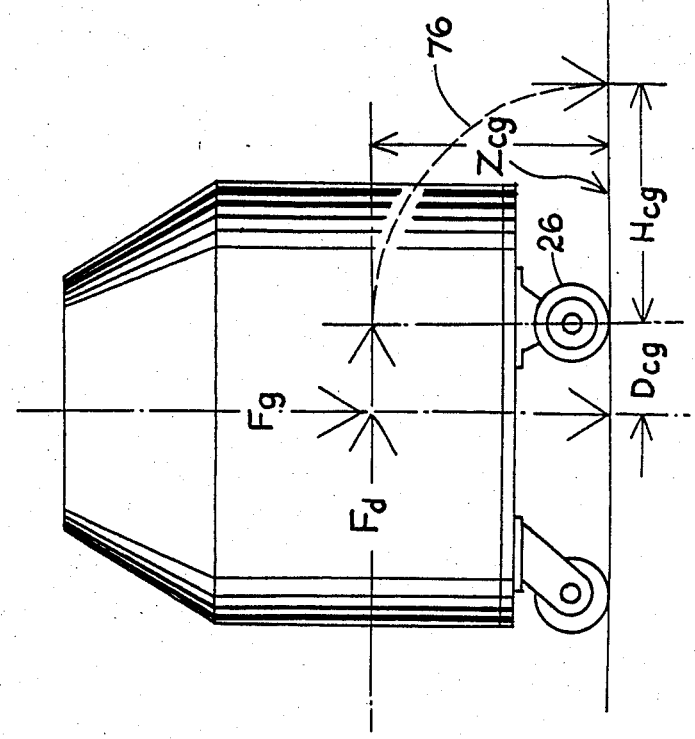
FIG. 11 is a side elevational view of a typical mobile base illustrating dynamic stability on a flat surface.

The resultant force can be shown as a single force pushing in the direction opposite to the acceleration of the mobile robot along a line running through the center of gravity of the mobile robot. This is shown diagrammatically in FIG. 11, where in the worst case shown, the force (Fd) is due to deceleration and is acting to keep the mass of the mobile robot in motion. This force is typically known as inertia. Since the braking action is occurring at the ground contact points, the inertia force can be shown to be a moment acting at a distance equal to the height of the center of gravity (Zcg). This moment of inertia is acting to cause the mobile robot to rotate forward along the arc 76 shown in FIG. 11 between its front wheels. The only force that can keep this moment of inertia from tipping the mobile robot is the moment acting through moment arm Dcg due to the force of gravity (Fg) acting through the mobile robot center of gravity. This force (Fg) thus acts on the other side of wheel 26. It should be noted that as the mobile robot begins to tip forward, the moment arm Dcg begins to shorten, thereby reducing the moment of inertia acting in the counter-clockwise direction and thereby allowing the mobile robot to tip over more readily. It is therefore obvious that the lower the value of Zcg, the less likely the mobile base will tip over if there is any tilting of the carriage system.

Figure 12:
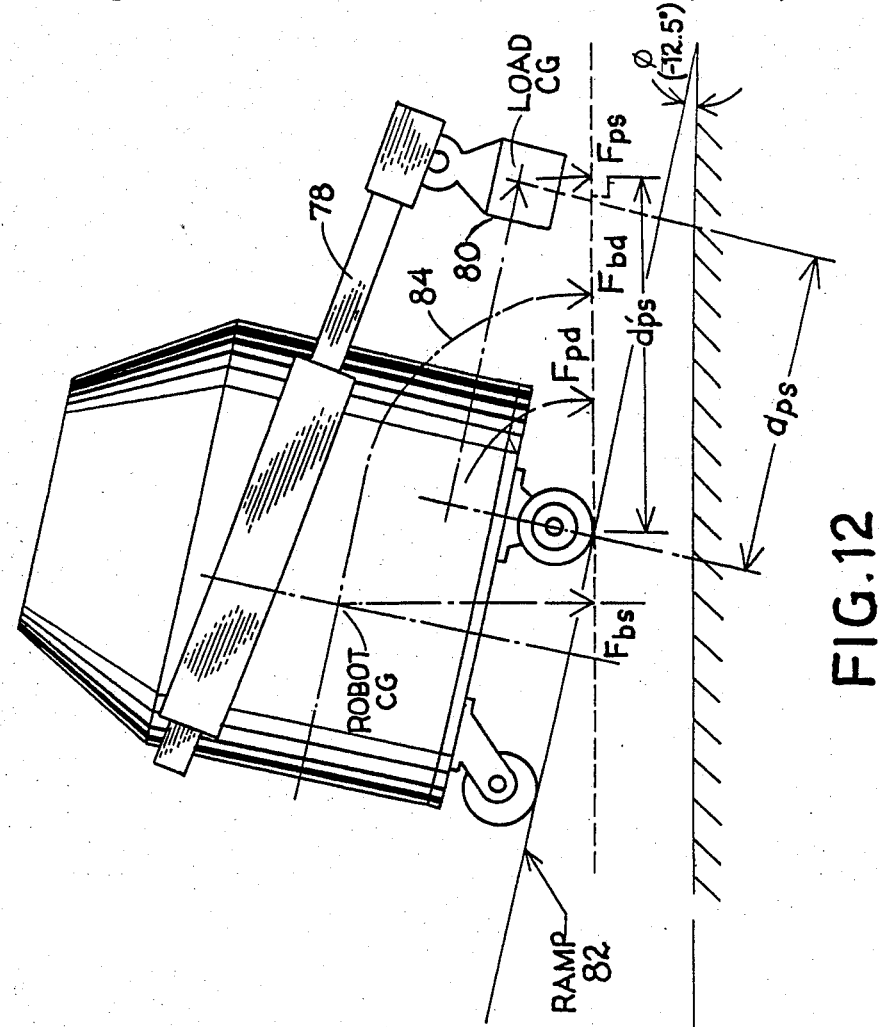
FIG. 12 is a side elevational view of a typical mobile base illustrating dynamic stability for a mobile robot carrying a load when it is operating on a slanted surface or ramp.

In order to better conceptualize this problem, FIG. 12 illustrates a typical mobile robot equipped with an arm 78 carrying a load 80 down a ramp 82. The net moment of inertia tending to rotate the mobile robot forward is thus the sum of the static and dynamic moments of inertia of the load and the dynamic moment of inertia for the mobile robot. If the sum of these moments is greater than the static moment of the body, the mobile robot will tip over in the direction of arc 84. The slope of the ramp is taken into account with respect to these moments as a modification of the static moment of inertia distances. By determination of these distances, the determination of stability is straightforward. This particular method, however, is complicated when a general consideration of a mobile robot executing a turn on a grade is considered.

Figure 13:
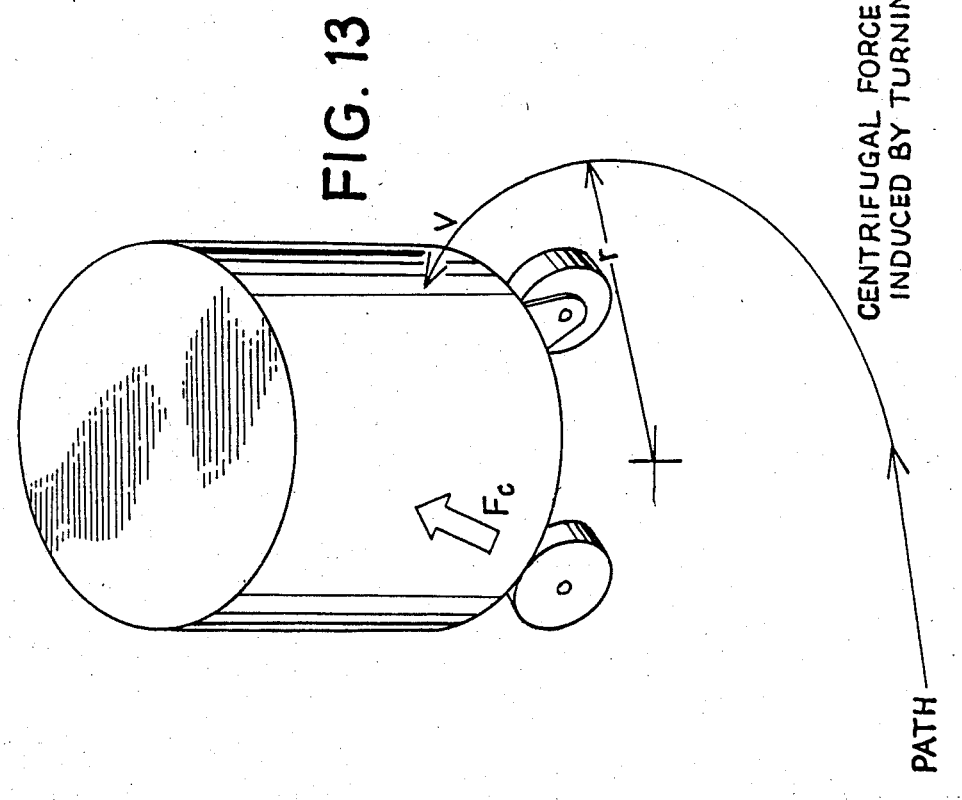
FIG. 13 is a perspective diagrammatic representation of a typical mobile base illustrating centrifugal force induced by turning.

The effect of turning generates what is known as a dynamic turning force that must be taken into consideration. Thus, as shown in FIG. 13, a mobile robot is shown moving at a constant velocity v in an arc having a radius r. Although the magnitude of its velocity is not changing, the direction of its velocity is changing, and thus the robot is undergoing centrifugal acceleration. Each mass of the mobile robot thus experiences a force normal to the direction of motion which is thus perpendicular to the tangent of the direction of motion at any instant. The equivalent acceleration and the net force acting on the center of gravity of the mobile robot as a result of this acceleration is given by the following equations:

$$Ac = v^2/r$$

and $$Fc = (m*v^2)/r$$

where
Ac is the equivalent centrifugal acceleration,
Fc is the centrifugal force induced by turning,
m is the mass of the mobile robot in pounds/32 or kilograms,
v is the longitudinal velocity in feet/second or meters/second, and
r is the radius of turn in feet or meters.

Figure 14A:
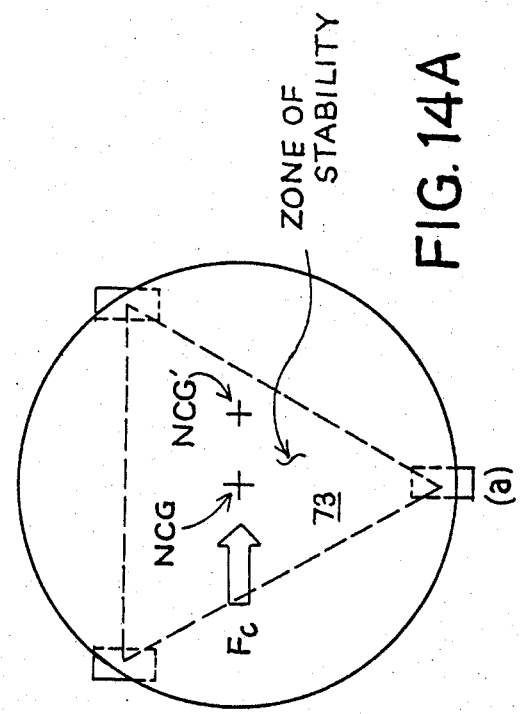
FIG. 14A is a top plan diagrammatic view of a typical mobile base illustrating the normal center of gravity (NCG) and movement of the normal center of gravity (NCG') due to a force $F_c$.
Figure 14B:
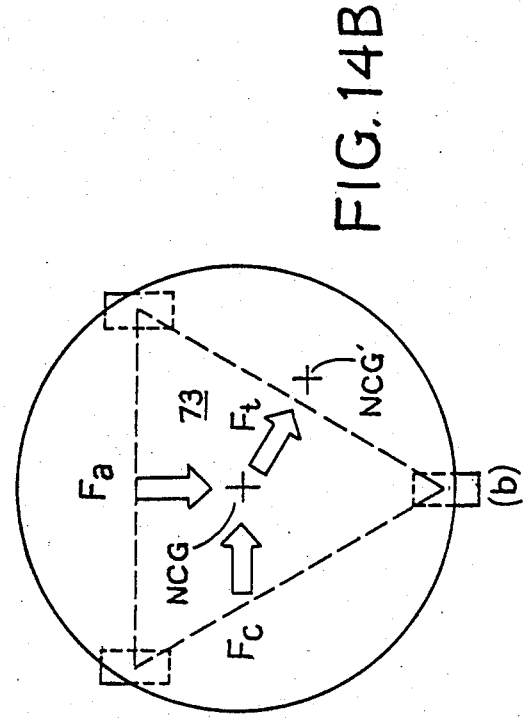
FIG. 14B is a top plan diagrammatic view of a typical mobile base similar to that shown in FIG. 14A, illustrating movement of the normal center of gravity (NCG') due to a combination of forces $F_a$ and $F_c$.

As illustrated in FIG. 14A, for a constant velocity turn, the result of such deflection moves the transposed normal center of gravity (now NCG') to a new location within the zone of stability. If, however, the mobile robot begins to accelerate a new force Fa acts on the robot as described earlier. The forces Fa and Fc then produce an equivalent force Ft as shown in FIG. 14B. The magnitude of this equivalent force is simply equal to the square root of the sum of the squares of the two contributing forces and may, depending upon the amount of acceleration, be sufficient to deflect the normal center of gravity (NCG') outside the zone of stability and thus the mobile robot would tip over in that direction.

With these considerations in mind, it is readily evident that in order to ensure that a mobile robot is stable when operating on ramps or executing turns, it is desirable to increase the zone of stability by extending the wheels of the carriage system outwardly from the center of gravity. However, if a carriage system employs such legs in a permanent configuration, it is unable to maneuver in close quarters. Due to this problem, the present invention in its modified embodiment further comprises extensible leg assemblies which simultaneously extend to allow greater stability and simultaneously retract to maneuver through tight or narrow quarters.

Figure 1:
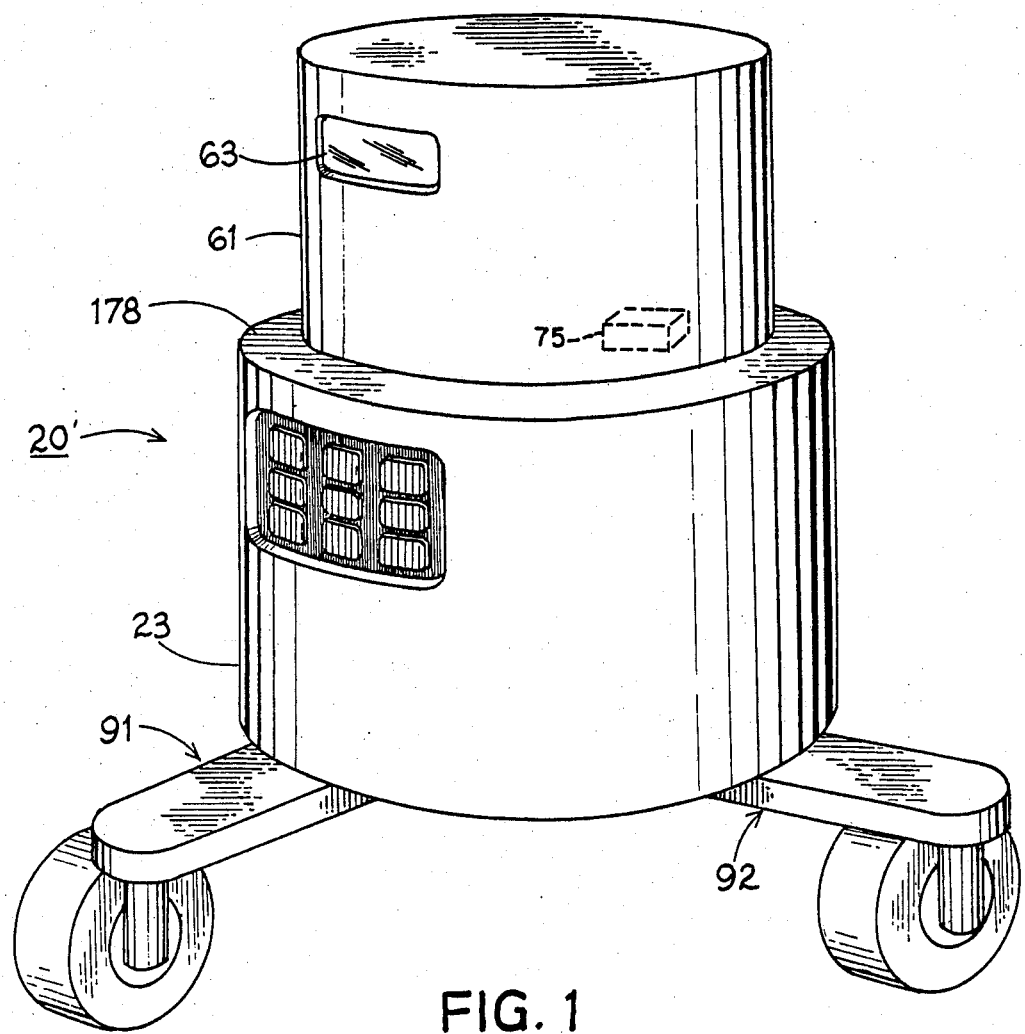
FIG. 1 is an overall perspective view of the mobile base (carriage system) with extensible leg assemblies, further showing in perspective view a housing or turret of a robot placed thereon so as to form an overall mobile robot.
Figure 20:
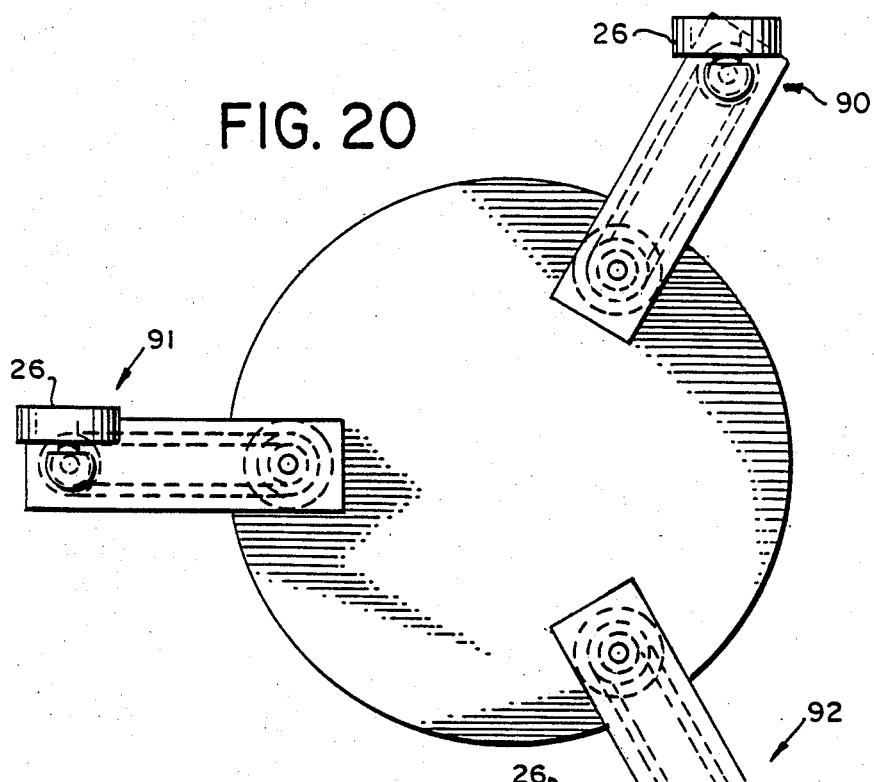
FIG. 20 is a diagrammatic bottom view of the mobile base shown in FIGS. 1 and 15 with the leg assemblies in their extended position.
Figure 21:
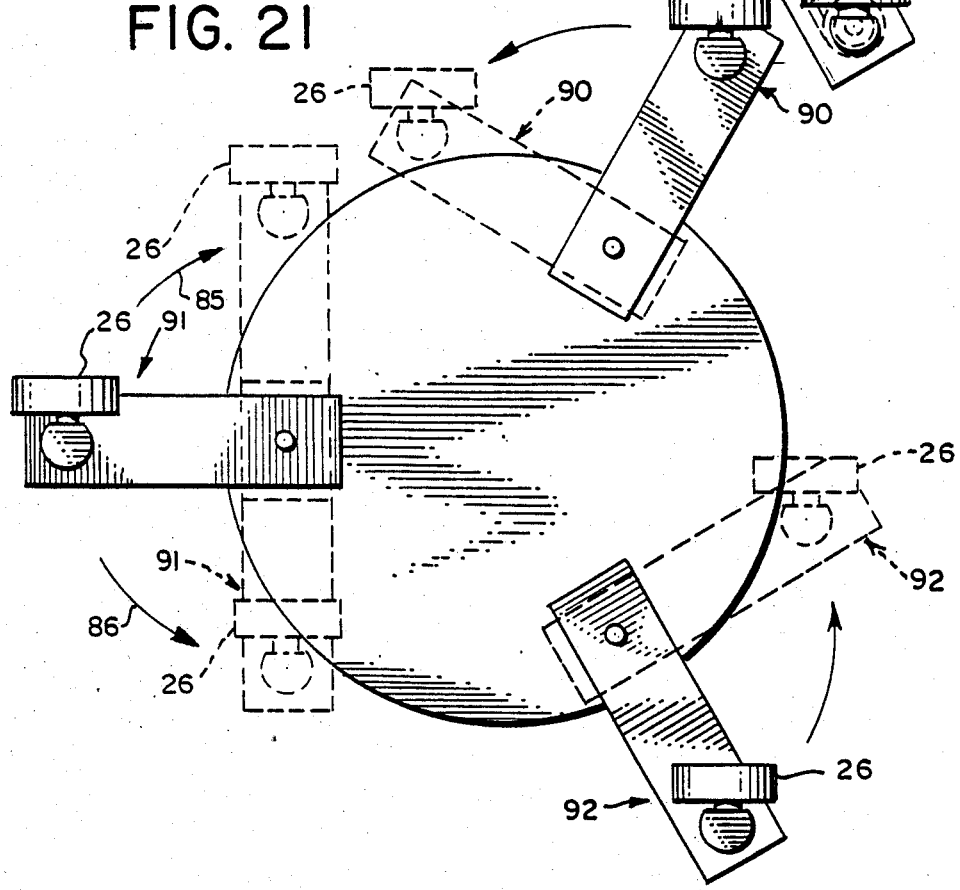
FIG. 21 is a diagrammatic bottom view of the mobile base shown in FIGS. 1, 15, and 20 illustrating movement of the leg assemblies in either the counter-clockwise or clockwise direction.

As best seen in FIGS. 1 and 15, the mobile base 20' of the alternative embodiment of the present invention incorporates not only those elements previously recited with respect to the embodiment shown in FIGS. 4–7, but also leg assemblies 90, 91 and 92 which can be extended outwardly as shown in FIGS. 1, 15 and 20 or pivoted inward as shown in phantom in FIGS. 21, 24A and 25A. When in the extended position, wheels 26 are farther away from mobile base's center of gravity, and therefore the zone of stability for the mobile base is increased for the reasons presented in the above subsection entitled "Stability of a Carriage System."

Diagrammatic representation of leg assemblies 90, 91 and 92 is presented in FIGS. 16 and 17 for both the driven end 93 and the distal wheel assembly end 97. Detailed views of driven end 93 and distal end 97 are presented in FIGS. 22 and 23. Chain 94 connects between lower drive sprocket 95 and wheel drive sprocket 96 so as to provide axial movement of wheel 26 by means of shaft 34 and the gear interrelationship such as shown in FIG. 7 by miter gears 30 and 32 for the previous embodiment of the present invention and also shown in FIG. 23. Sprocket 95 is driven by power chain 48 as best seen in FIGS. 15 and 17. As shown in FIG. 17, chain 48 interfaces with power drive sprocket 36 which is connected by a drive cylinder 98 to sprocket 95.

Similarly, steering of wheel 26 is provided by turning wheel steering sprocket 104 through chain 106 which in turn is driven by lower steering sprocket 109 as seen in FIGS. 16, 17, 22 and 23. The steering chain 54' as shown in FIGS. 15 and 17 is in turn driven by steering drive sprocket 40' as shown in FIG. 17. This steering drive sprocket is only associated with leg assembly 92 shown in FIG. 17 while the steering drive sprockets 40" associated with leg assemblies 90 and 91 are driven by drive chain 54'. As shown in FIG. 17, the steering drive sprocket 40' is turned by means of steering motor 108 through gear reducer 110. The motor is attached to the carriage system sidewall 23 by bracket 81.

FIG. 17 also shows that steering tube 38' is positioned with respect to chain 106 and steering shaft 112 so that all three wheels for leg assemblies 90, 91 and 92 are aligned with each other. This is shown in more detail in FIG. 22 where it is seen that lower steering sprocket 109 is positioned on shaft 112 by means of key 111 and set screw 115. Steering shafts 112 for leg assemblies 90 and 91 each have a tapered section 113 so that steering drive sprocket 40' can be press-fitted and aligned thereon. This allows each wheel 26 to be properly oriented with respect to each other.

The three leg assemblies are rotated outwardly and inwardly in the direction of arrow 85 or 86 as shown in FIG. 21 by turning leg assembly retraction sprocket 114 for each of the three leg assemblies. As seen in FIG. 21, wheels 26 maintain the same orientation throughout retraction or extension of the leg assemblies due to turning of chain 106 and thus rotation of wheels 26.

As best seen in FIGS. 24A and 24B, the leg assemblies 90, 91 and 92 can be extended or retracted while the carriage system 20 is in translation as shown by arrow 41. As such a retraction or extension is made, each wheel pivot point 37 maintains its spatial relationship with respect to the base 60 along corresponding radial lines 39, 39' and 39''. As illustrated by imaginary point A on base 60 and imaginary point B on upper torso 61, as such an extension or retraction is made the base 60 moves angularly along an angle theta ($\theta$) after a retraction is made such as shown in FIG. 24B. The angular movement of the base is in a direction so as to allow pivot points 37 to remain aligned with radial lines 39. In this manner the orientation of wheels 26 is maintained throughout the retraction or extension operation. This uniform orientation of the wheels during extension or retraction is obtained by turning lower steering sprockets 109 in each leg assembly (see FIGS. 17 and 22) due to the angular movement of the legs as they rotate with respect to the base 60.

Since the upper torso 61 maintains its orientation to the floor corresponding to the direction of the wheels 26, the upper torso as shown by point B maintains its directional orientation during an extension or retraction of the leg assemblies. This is particularly important since in a translation motion the sensors 63 (see FIG. 1) associated with the upper torso for vision and other parameters are normally positioned in the direction of motion and should not turn when the base makes an angular movement due to retraction or extension of the leg assemblies.

As shown in FIGS. 25A and 25B, the present invention also allows extension and retraction of the leg assemblies while the carriage system 20 is stationary with respect to the floor surface. This is accomplished by commanding the base to turn in place, while driving the retraction system. When the legs have retracted/extended to the desired position, the steering drive is continued until it reaches the next complete turn and is then halted. Control electronics 75 (see FIG. 1) connected to tachometer 124 (see FIG. 22) and other sensors through slip ring 180 (see FIG. 18), actually determine when the wheels have completed the turn. Again the wheel pivot points 37 move radially inwardly or outwardly along radial lines 39, 39' and 39'' for leg assemblies 90, 91, and 92 respectively. Similarly, base 60 undergoes an angular displacement, theta, equal to that for the translational retraction or extension of the leg assemblies.

The wheels (as shown in FIG. 25A) actually make multiple turns in a helical type path 105 as shown in FIG. 25B when a retraction or extension of the leg assemblies is undertaken in this fashion.

Path 105 shows the direction of movement for a retraction. The direction of movement for an extension is the same path but with the arrows in the opposite direction. By undergoing the helical path 105 in an extension or retraction, slippage with respect to the wheels and the floor is minimized, therefore greatly increasing the efficiency of the system and also minimizing marring of the floor surface. It has been experimentally found that three complete circular paths as shown by path 105 made by each wheel are sufficient in an extension or retraction movement when the base is not in translation.

As shown in FIG. 25A, a point A on the base undergoes an angular displacement with respect to the floor equal to the angle theta when a retraction or extension is made, while a point B on the upper torso maintains its same orientation with respect to the floor surface since the starting and stopping orientation of wheels 26 is the same.

Figure 22:
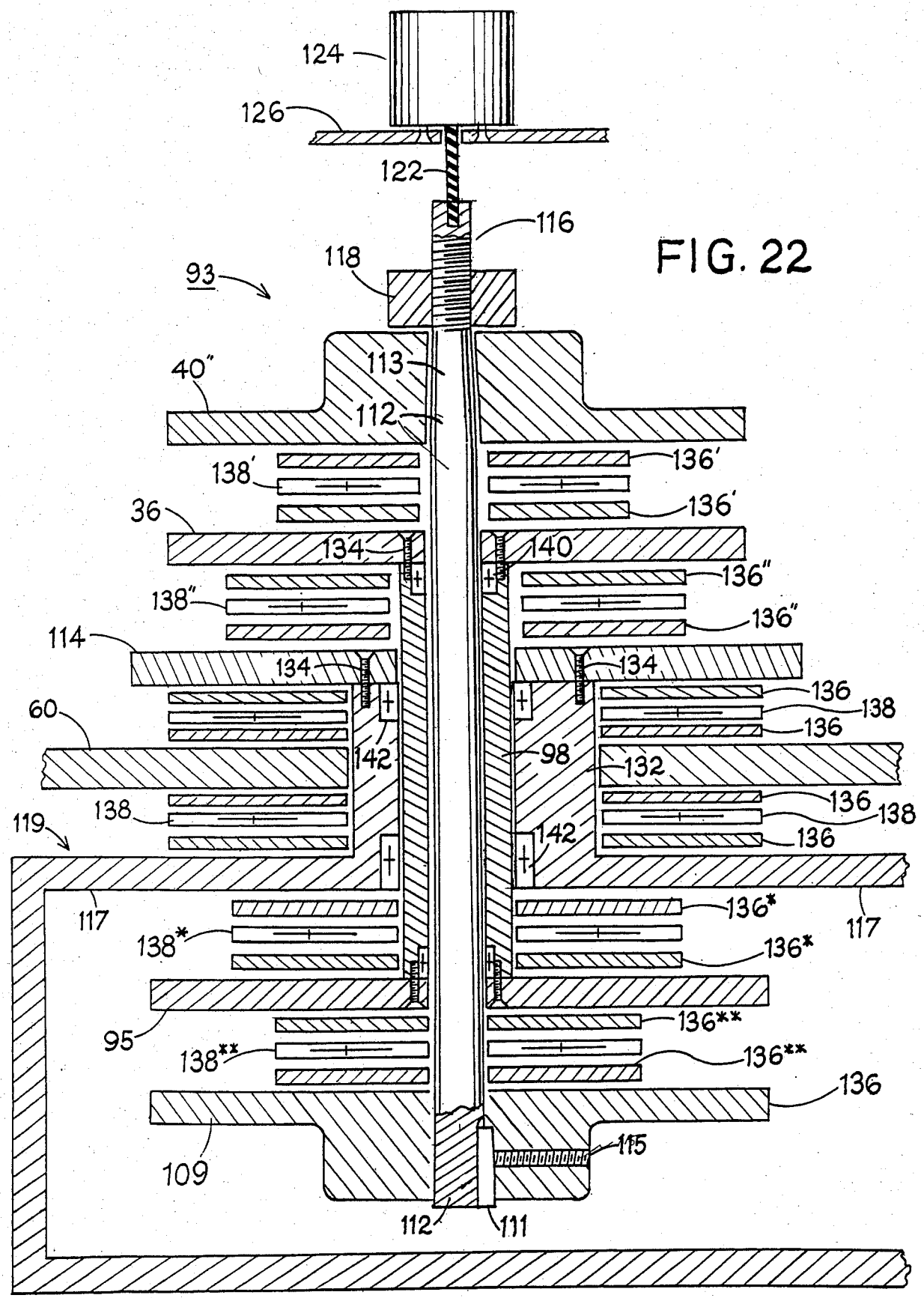
FIG. 22 is an enlarged cross-sectional view of the leg assembly driven end illustrating placement of the gear sprockets as well as the bearings and washers used to form the overall driven end of the leg assembly.

FIG. 22 illustrates a detailed, enlarged view of the leg assembly driven end 93. It is seen that the steering tube chain sprocket 40'' connects to shaft 112 at a tapered region 113. The upper portion of this tapered region terminates in a threaded section 116 about which is placed locking nut 118 for leg assemblies 90 and 91. As shown in FIG. 17, for leg assembly 92, a flex coupling 120 connects shaft 112 to shaft 117 of gear reducer 110.

As shown in FIG. 22, leg assembly 90 or 91 further includes a rubber flexible shaft 122 which mates with the upper end of threaded portion 116 of shaft 112 so as to rotate a two-channel pulse tachometer 124. The pulse tachometer is supported to the carriage base sidewall 23 (see FIG. 1) by means of a mounting bracket 126. The dual-channel tachometer gives both direction and speed information which can then be used by the robot control electronics 75 associated with the mobile base for determining its amount and direction of turning. The pulse tachometer shown is preferably one manufactured by Dynamics Research Corporation of Wilmington, Mass., Model 152-121-500-18SJ215.

FIG. 22 also shows relative placement of the power drive sprocket 36, leg assembly retraction sprocket 114, lower drive sprocket 95 and lower steering sprocket 109. The lower steering sprocket is preferably of the hub variety placed about the lower termination of shaft 112 and mated to the shaft by key 111 and set screw 115. Thus, sprocket 109 rotates corresponding to the rotation of steering chain sprocket 40'.

Likewise, lower drive sprocket 95 is mechanically interconnected to drive sprocket 36 via cylinder 98. Retraction chain sprocket 114 is connected to the leg assembly 90, 91, or 92 at the upstanding cylinder portion 132 of the leg assembly. Machine screws 134 secure the retraction chain sprocket to the upstanding cylinder portion 132 which in turn is integral with the top wall 117 of the leg assembly housing 119. The base plate 60 is positioned between the retraction chain sprocket 114 and the leg assembly 90 while flat washers 136 are sandwiched about thrust bearings 138 so as to minimize friction when the leg assemblies are retracted or extended as shown in FIGS. 20 and 21.

Similarly, flat washers 136' and thrust bearing 138' are positioned between the steering chain sprocket 40' and power drive sprocket 36 to minimize friction therebetween while flat washers 136'' and thrust bearing 138'' are positioned between power drive sprocket 36 and retraction chain sprocket 138 for similar purposes Ball bearings 143 are used at the lower end of shaft 34 and between the lower end of steering housing 38' and axle 28. Convex covers 145 are used to keep dirt out of the interior portion 147 of distal wheel assembly end 97. Ribs 149 are used to stiffen the overall structure.

Similar flat washers and thrust bearings are placed between the inner surface of the leg assemblies 90, 91, and 92 and the lower drive sprocket 95 as well as between the lower drive sprocket 95 and lower steering sprocket 109 as shown by washers 136* and thrust bearing 138* and washers 136 and thrust bearing 138 respectively.

In order to minimize frictional effects between shaft 112 and power shaft 98, needle roller bearings 140 are positioned as shown in FIG. 22, while roller bearings 142 are similarly employed to minimize friction between power shaft 98 and cylinder portion 132 of leg assemblies 90, 91 or 92. It is therefore readily apparent that the steering, driving and retraction movement of the leg assemblies is accomplished in an efficient and low friction manner while maintaining the attributes of the system as recited above.

Figure 23:
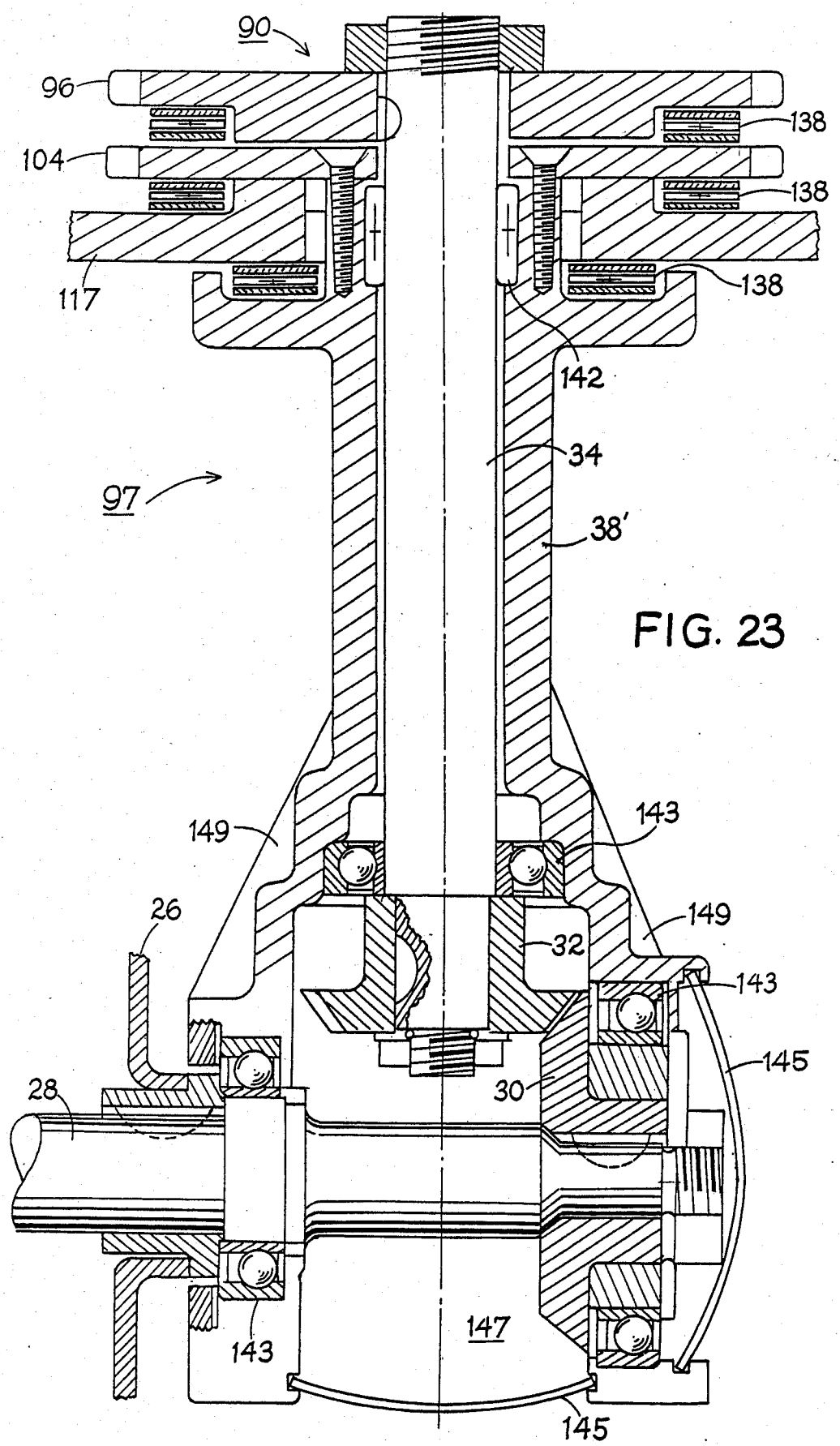
FIG. 23 is an enlarged cross-sectional view of the distal wheel assembly end of the leg assembly showing its elements in a manner similar to that in FIG. 22.

Although not shown in FIGS. 16 and 17, similar thrust bearings 138 and roller bearings 142 are employed between wheel drive sprocket 96 and wheel steering sprocket 104 as shown in the detailed view of this portion of the leg assembly as shown in FIG. 23.

Referring again to FIGS. 15 and 19, a drive motor 144 is mounted to a gear box 146 so as to turn power drive sprocket 148 which is associated with drive chain 48. The motor is preferably a samarium-cobalt permanent magnet motor which can operate up to 5,000 revolutions per minute (r.p.m.) with a normal maximum operating speed of 3,200 r.p.m. In the preferred embodiment of the present invention, it is manufactured by Inland Motors, Industrial Devices Division, Kollmorgen Corp., 201 Rock Road, Radford, Va. 24141, bearing model number TM-2950-3003-D. The gear box is a 17 to 1 (17:1) gear reducer manufactured by the Sumitomo Machinery Corp. of America, Seven Malcom Street, Teterboro, N.J. 07608 under the trademark 5M-Cycle.

Motor 144 is connected to gear box 146 by means of mounts 150 while mount 150' connects gear box 146 to base plate 60 of the carriage system. A flex coupling 152 connects the output shaft 153 of the motor to the input shaft 154 of the gear box.

As also shown in FIG. 15, a leg retraction servo motor 156 is mounted to base plate 60 so as to drive retraction chain 158 which controls leg assemblies 90, 91, and 92. In order to ensure that the retraction of the legs does not extend more than shown in FIG. 21 in either a clockwise or counter-clockwise direction (see arrows 85 and 86), microswitches 160 and 161 are positioned on base 60 so as to be selectively operated by block 162 which is mounted on the retraction chain 158. This block activates switch 160 when the legs are retracted in the counter-clockwise direction (looking down on the carriage system) as shown in FIG. 15 and activates switch 161 when the legs are retracted in the clockwise direction as shown in FIG. 15. This information actually represents a failsafe mechanism to ensure deactivation of the leg retraction servo motor if the electronics 75 associated with the mobile robot fail to deactivate the motor in time. Thus, in order to sense the movement of the retraction chain, a 10-turn potentiometer 168 is coupled to an idler 170 so as to turn as the retraction chain moves and thereby send analog information to circuitry 75 (see FIG. 1) associated with the mobile robot to inform the robot of the direction and amount of movement of the retraction chain. Normally this information is sufficient to control the retraction servo motor 156, but the micro-switches 160 and 161 provide additional safety backup to the overall mobile robot.

The leg retraction servo motor 156, steering motor 108 and drive motor 144 receive their electrical power from batteries 164, 165 and 166 under the control of the mobile robot within the upper torso 61 (see FIG. 1).

In addition to idler 170 used in conjunction with potentiometer 168, idlers 172 are positioned as shown in FIG. 15 so as to increase the purchase associated with the various sprockets 40, 36 and 114 as well as those associated with the retraction motor 156 and the drive motor 144 and also to maintain non-interference between the various chains 48, 54' and 158.

As also seen in FIGS. 15 and 18, a central sprocket 174 is associated with steering chain 54' so as to cause rotation of center shaft 176 which passes through top 178 of the carriage system (see FIGS 1 and 18) so as to turn the mobile robot upper torso 61 as the carriage system executes a turn. As shown in FIG. 18, a six-wire slip ring 180 passes turret power and serial communication information to the mobile robot turret by means of cable 182 and electrical connector 183. In this way, turning the mobile base in no way interferes with the electrical connections between the carriage system and the mobile robot placed thereon.

It is therefore apparent that the present invention discloses a carriage system which provides for simultaneous driving and turning of the wheels associated with the carriage system as well as means for simultaneously extending or retracting leg assemblies associated with the carriage system. The leg assemblies allow for increased center of gravity (zone of stability) to the overall carriage system when in the extended position yet allow the carriage system to pass through relatively narrow passageways.

In both embodiments of the above present invention, the carriage system is able to change the direction of the wheels of the system while rotating the wheels and thereby minimize marring of the surface upon which the carriage system is placed as well as reduce wear to the wheels. This rotation of the wheels greatly reduces the friction with the floor and thereby makes the carriage system energy efficient. The retraction or extension of the leg assemblies is also accomplished with turning of the wheels so that their orientation in the retracted position is the same as in the extended position and so that energy efficiency is increased.

Concentric Shaft Embodiments

Figure 26:
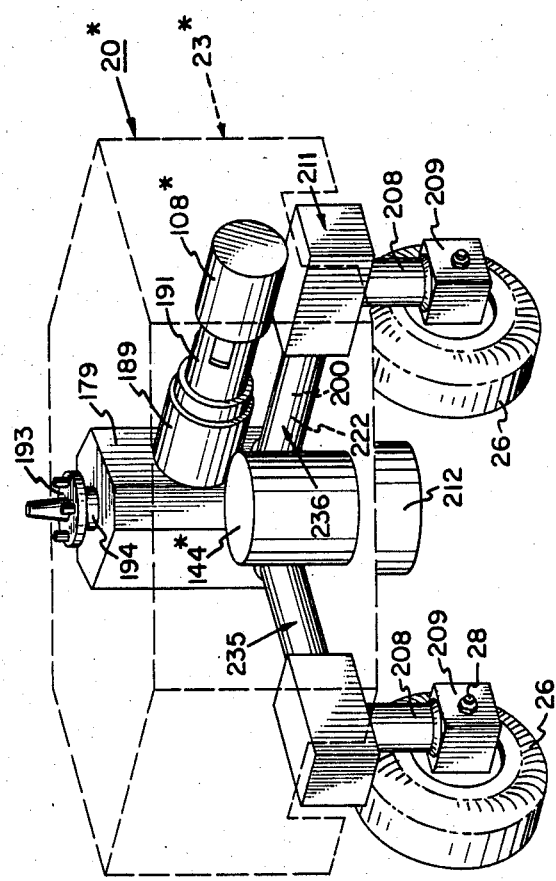
FIG. 26 is a diagrammatic perspective view of a concentric shaft mobile base with non-retractable legs according to the present invention.
Figure 28:
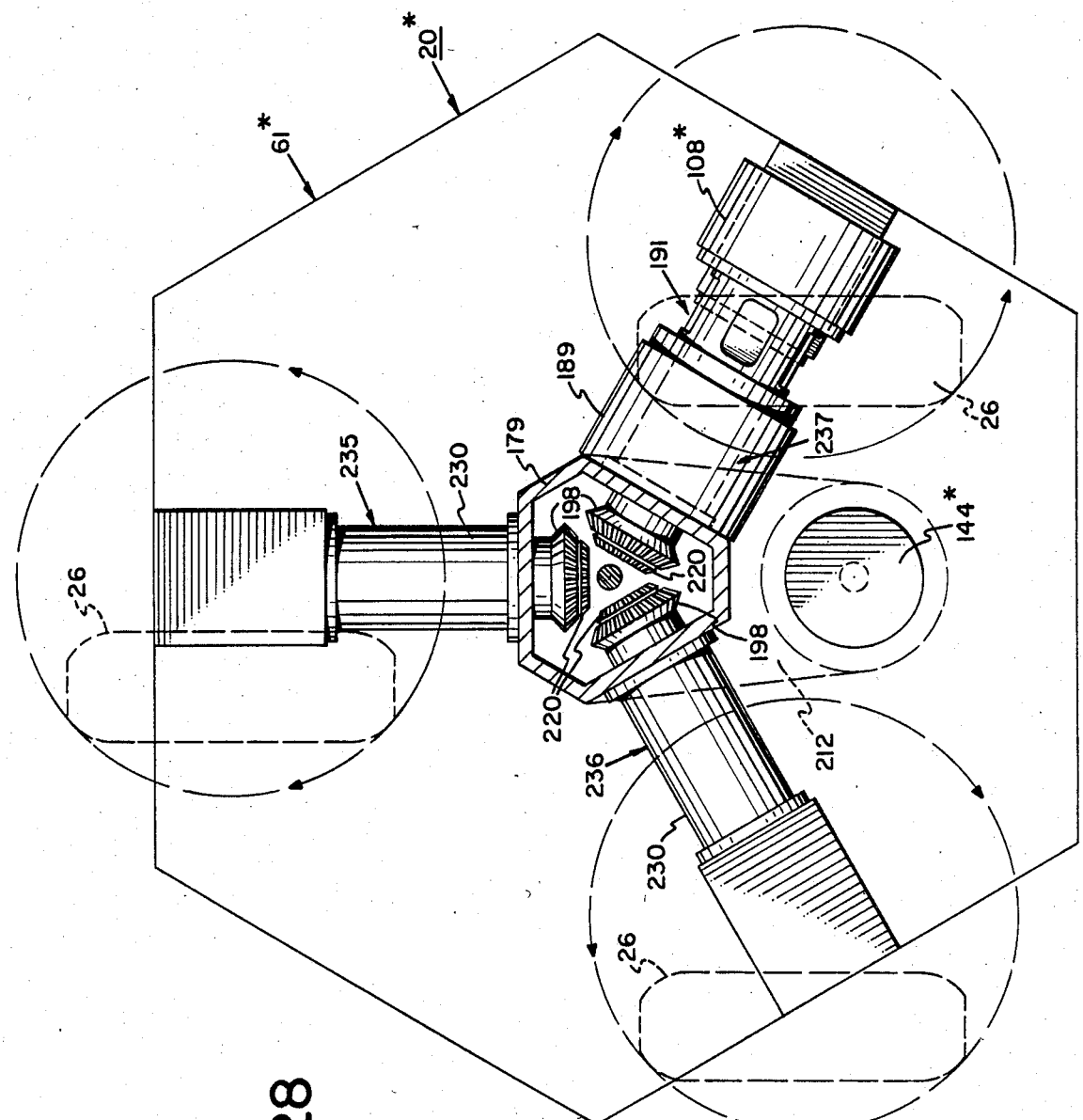
FIG. 28 is a diagrammatic top view of the concentric shaft embodiment shown in FIG. 26 showing each of the leg assemblies and the terminating end of their radially extending shafts for transmission of steering and drive power to the associated wheel assemblies and wheels.

The alternative embodiment of the present invention corresponding to the mobile base shown in FIGS. 4 and 7 is best seen in FIGS. 26 and 28. These figures illustrate a mobile base 20* wherein concentric steering shafts 200 and concentric driving shafts 222 (shown in phantom) are used to replace the functions of steering chain 54 and drive chain 48 shown in the embodiment of the invention of FIGS. 1 and 15.

Figure 27:
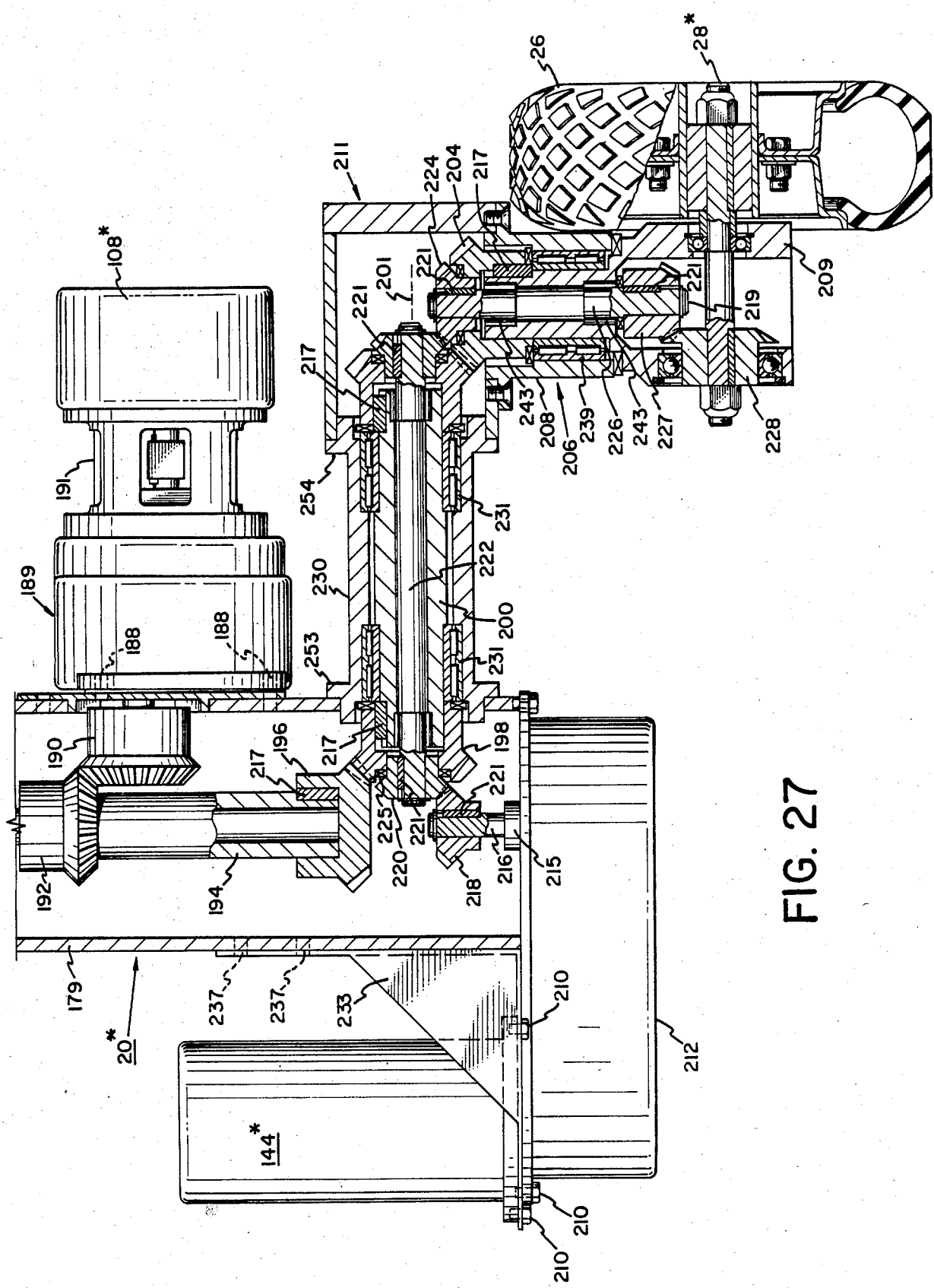
FIG. 27 is the cross-sectional view of one leg assembly of the embodiment shown in FIG. 26, illustrating transmission of wheel drive and wheel steering power to the associated wheel and wheel assembly.
Figure 29:
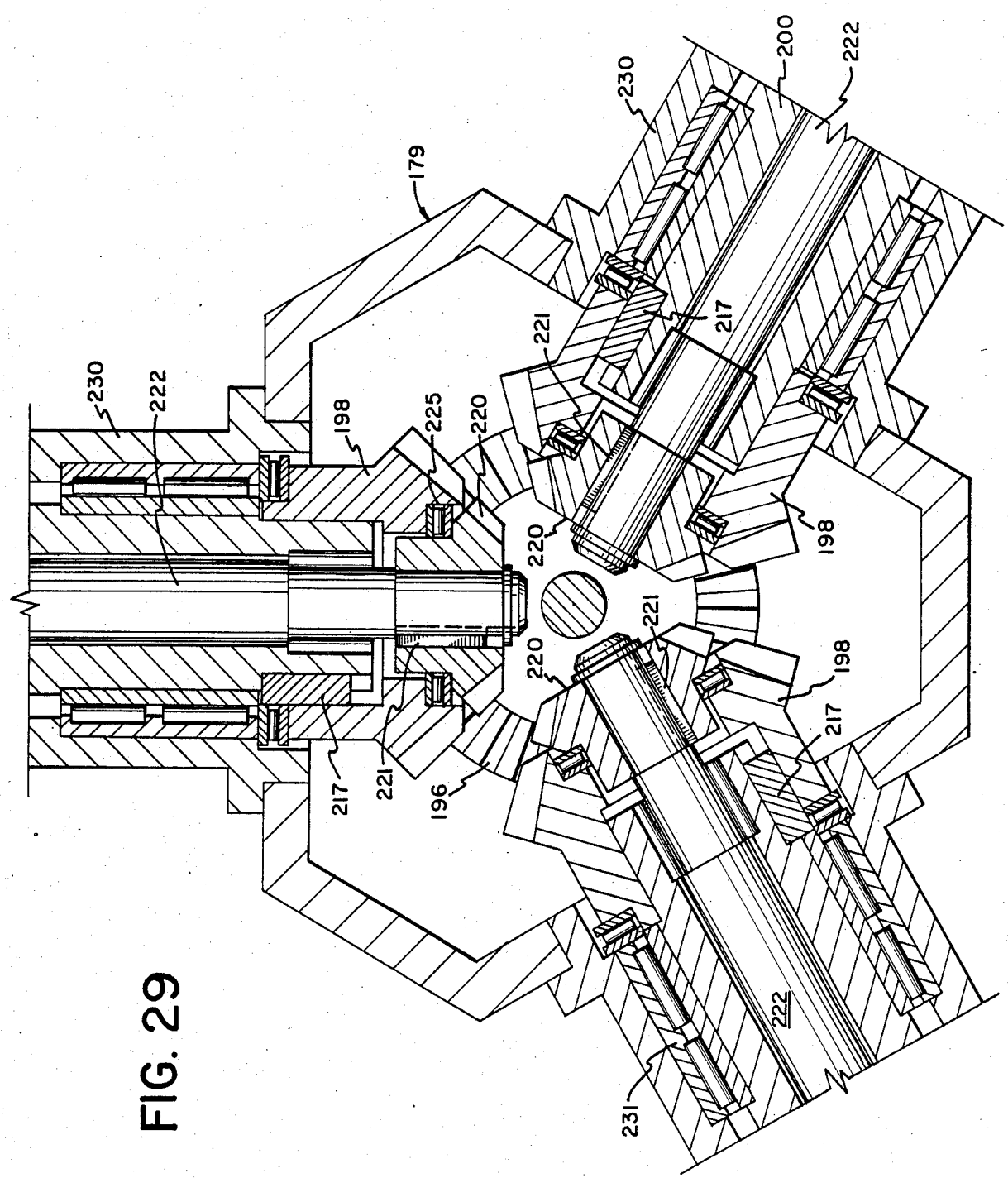
FIG. 29 is an enlarged top cross-sectional view of the terminating end of the radially extending concentric shafts of the embodiments shown in FIGS. 26 and 32 showing the inner gears on the concentric shafts meshed with a ring gear providing drive power and the outer gears on the concentric shafts meshed with a ring gear providing steering power.

The manner in which wheel 26 is driven is best understood with reference to FIGS. 27-29. FIG. 27 illustrates drive steering motor 108* connected to gear reducer 189 via flexible coupling 191. Gear reducer 189 is mounted to mobile base 20* by means of machine screws 188 fastened to mobile base central housing 179 which defines the reference frame for the mobile base. The gear reducer has an output gear 190 emanating therefrom. This gear meshes with gear 192 which is associated with shaft 194 of universal driving and steering assembly 197. As shown in FIG. 26, this shaft is connected at one end to flange 193 which mounts to turret 61 (see FIG. 1). Therefore, the turret turns whenever the steering motor output gear turns.

Referring again to FIG. 27, shaft 194 at its lowermost end terminates with a gear 196 which in turn meshes with the gear 198 of leg assembly 235 in order to convert the plane of rotation by 90°. Leg assembly 235 is secured to the reference frame of mobile base 20* by means of leg assembly housing 230 which is mounted to central housing 179. This gear is connected to a shaft 200 which axially rotates in housing 230 by means of bearings 231. The other end of this shaft is connected to a similar gear 202. This gear in turn meshes with a similar gear 204 fastened to wheel assembly housing member 209 which in turn is axially pivotable about wheel assembly housing member 208 by means of bearing 239. Axle 28* is axially rotatable within housing member 209. In this manner, wheel assembly 206, and thus wheel 26, is controllably pivoted about axis 207. All these gears are slotted and positioned on their respective shafts through use of keyways 217. The gears are therefore able to longitudinally move in and out with respect to the shaft upon which they are placed so as to localize tolerance buildup on the shafts.

The steering gears are maintained in their longitudinal positions with respect to the shafts that they are mounted on by means of bearings 225 which contact drive gears 220, 223 and 224. The drive gears are axially positioned on their respective shafts 216, 222 and 226 by means of keyways 221 in a manner analogous to steering gears 196, 198, 202 and 204. The drive gears are in turn longitudinally captured on their respective drive shafts by C-rings 219. Therefore, the leg steering gears are effectively longitudinally captured by bearing 225 in combination with the drive gears and C-rings.

Since C-rings 219 are resilient, they allow for tolerance variations in both the drive and steering gears. Therefore, tolerance buildup which would otherwise occur if the steering and drive gears were longitudinally fixed on their respective shafts is eliminated.

In summary, rotation of steering output gear 190 causes rotation about axis 199 with corresponding rotation of gear 192 and rotation of shaft 194 about axis 195. Gear 196 is therefore rotated with this rotation passed to gear 198 causing shaft 200 to rotate about axis 201. Through gear 202 this rotation imparts rotation of gear 204 and corresponding rotation of wheel assembly 206 about axis 207.

Figure 30:
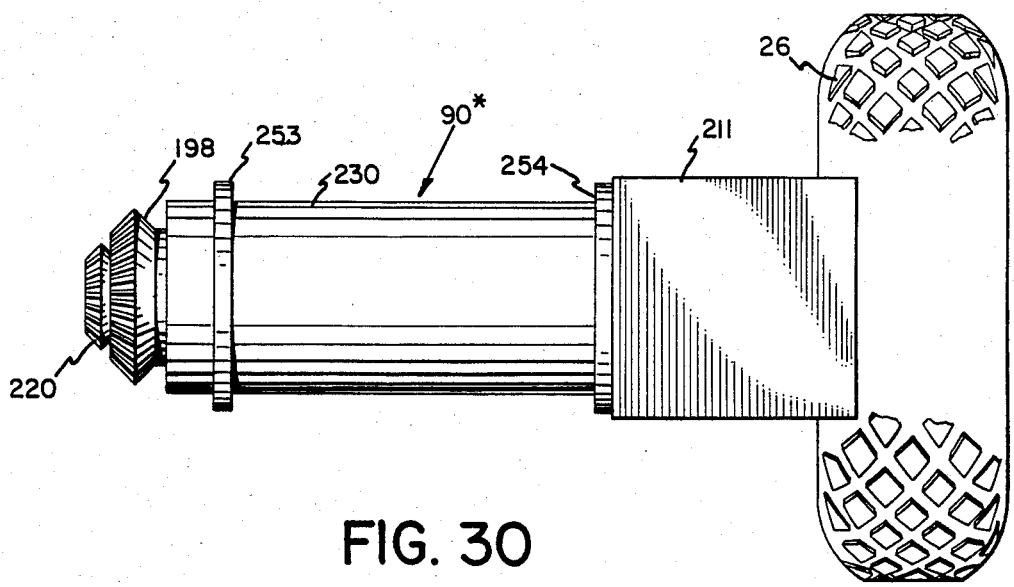
FIG. 30 is a top plan view of a leg assembly of the embodiment of the invention shown in FIG. 26.

Although only one leg assembly 235 is shown in FIG. 27 connected to central housing 179, two other leg assemblies are connected to the central housing as shown in FIGS. 26, 28, and 29. As seen in FIGS. 27 and 30, flanges 253 are affixed to each leg assembly shaft covering 230. The flanges are in turn mounted to the central housing 179 by machine screws or the like (not shown). Similar flanges 254 are mounted on covering 230 and are used to facilitate connection to housing covers 211.

As seen in FIG. 27, rotation of drive motor 144* causes corresponding axial movement of drive axle 28* through use of interconnecting gears and concentric shafts. More particularly, motor 144* is mounted to the mobile base by means of machine screws 210 fastened to brace member 233 which in turn is secured to central housing 179 by machine screws 238. Motor 144* is connected to a 17 to 1 gear reducer 212 whose output is connected to drive shaft 216 of universal driving and steering assembly 197. The gear reducer is secured to the mobile base reference frame attachment to brace 233 and central housing 179. Rotation of shaft 216 imparts rotation to gear 218 connected at the other end of shaft 216. Gear 218 in turn meshes with gear 220 which in turn is connected to shaft 222 terminating at its other end with gear 223. Gear 223 in turn meshes with gear 224 which turns shaft 226 terminating at its other end with gear 227. Gear 227 in turn meshes with gear 228 which is connected to drive axle 28* so as to cause rotation of wheel 26.

As seen in FIG. 27, shaft 216 is axially positioned about bearing housing 215 and associated bearings 214.

Shaft 222 is concentrically positioned within shaft 200 and shaft 226 is concentrically positioned within wheel assembly housing member 209 by means of roller bearings 241 and 243, respectively.

It is readily apparent from FIG. 27 that by use of the concentric shafts and gears associated with steering motor 108* and drive motor 144* the transfer of power from these respective motors to the wheel assembly and wheel is obtained without the use of chains such as shown in the embodiment of the invention illustrated in FIGS. 15-19. The use of concentric shafts to transmit steering and drive power to the wheel assembly and wheel eliminates the purchase and alignment problems normally associated with the use of chains, and also eliminates the need for idlers on such chains for increasing the purchase of the chains about the various gears interconnected therewith.

Furthermore, the use of concentric shafts minimizes the potential source of contamination generated by gears and associated grease or lubricants used therewith since the concentric shafts are completely enclosed and are not exposed to the outside environment.

In addition, by elimination of the drive and steering chains associated with the mobile base embodiment shown in FIGS. 15-19, the drive motor can be positioned lower in the mobile base thereby lowering the center of gravity of the mobile base.

FIGS. 28 and 29 illustrate how ring gears 196 and 218 associated with the input power for steering and driving motion are intermeshed with the steering gears 198 and drive gears 220 of each of the three leg assemblies illustrated in FIG. 26. FIGS. 28 and 29 also show the leg assembly housing 230 associated with each leg shaft and its attachment to central housing 179. It should be noted that ring gears 196 and 218 have been omitted from FIG. 28 as to allow comparison of this figure with FIG. 29.

As best seen in FIG. 27, a housing cover 211 is attached to external shaft covering 230 so as to prevent exposure of gears 202, 223, 224 and 204 to the outside environment. In addition, wheel assembly housing cover 208 surrounds the upper portion of wheel assembly housing member 209 so as to prevent contamination to the outside environment by rotation of shaft 226 and associated gears 227 and 228. Thus, a sealed environment is obtained through use of the concentric shaft and housing arrangement.

FIG. 29 illustrates triangularly shaped central housing 179 which is used to isolate gears 196, 198, 218 and 220 from the outside environment. It also illustrates placement of keyways 217 and 221 for rotationally fixing gears 198 and 220 to shafts 200 and 222, respectively. FIG. 28 shows the overall arrangement of the leg assemblies 235, 236 and 237 and placement of steering motor 108*, flexible coupling 191, gear reducer 189, drive motor 144*, and gear reducer 212, as well as their general interrelationship with the leg assemblies. It also illustrates a typical overall outline of the mobile base sidewalls 23* if such sidewalls are used. It should be noted that the overall mobile base may not include sidewalls or a bottom plate, depending upon the needs of the particular user. FIG. 30 shows the general exterior appearance of one of the leg assemblies 235, the other two leg assemblies being identical thereto.

It is therefore apparent that through use of concentric shafts, the problems associated with the use of chains is eliminated for both steering and driving the wheels. The overall operation of the concentric shaft embodiment of the invention corresponds substantially to that discussed earlier with respect to the mobile base shown in FIGS. 15-19.

Figure 31:
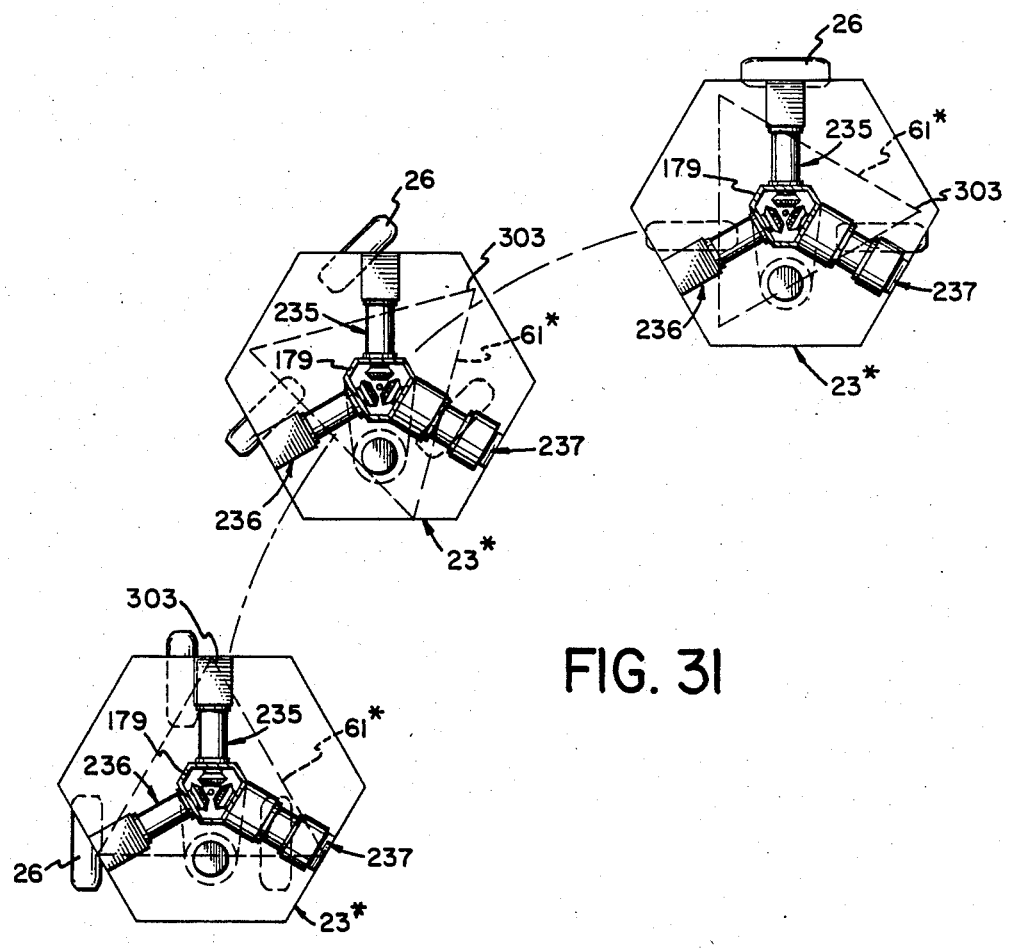
FIG. 31 is a series of diagrammatic representations of the concentric shaft embodiment of the invention shown in FIG. 26 illustrating the orientation of the wheels, the leg assemblies, the base, and the turret as a turn is negotiated.

FIG. 31 illustrates how a change in wheel direction of the mobile base causes the turret to undergo a similar change in direction with respect to the mobile base reference frame defined by the earth-orientation of mobile base central housing 179, leg assemblies 235, 236 and 237, and mobile base sidewalls 23*. Such changes in direction are analogous to the mobile base illustrated in FIGS. 15-19 and diagrammatically shown in FIG. 8 (for a turn of a four-wheeled version of the mobile base).

FIG. 39 is a perspective view of another embodiment using concentric shafts similar to FIG. 26 but having leg assemblies 236 which extend beyond the sidewalls 23* of the base.

Extensible Leg Concentric Shaft Mobile Base

Figure 32:
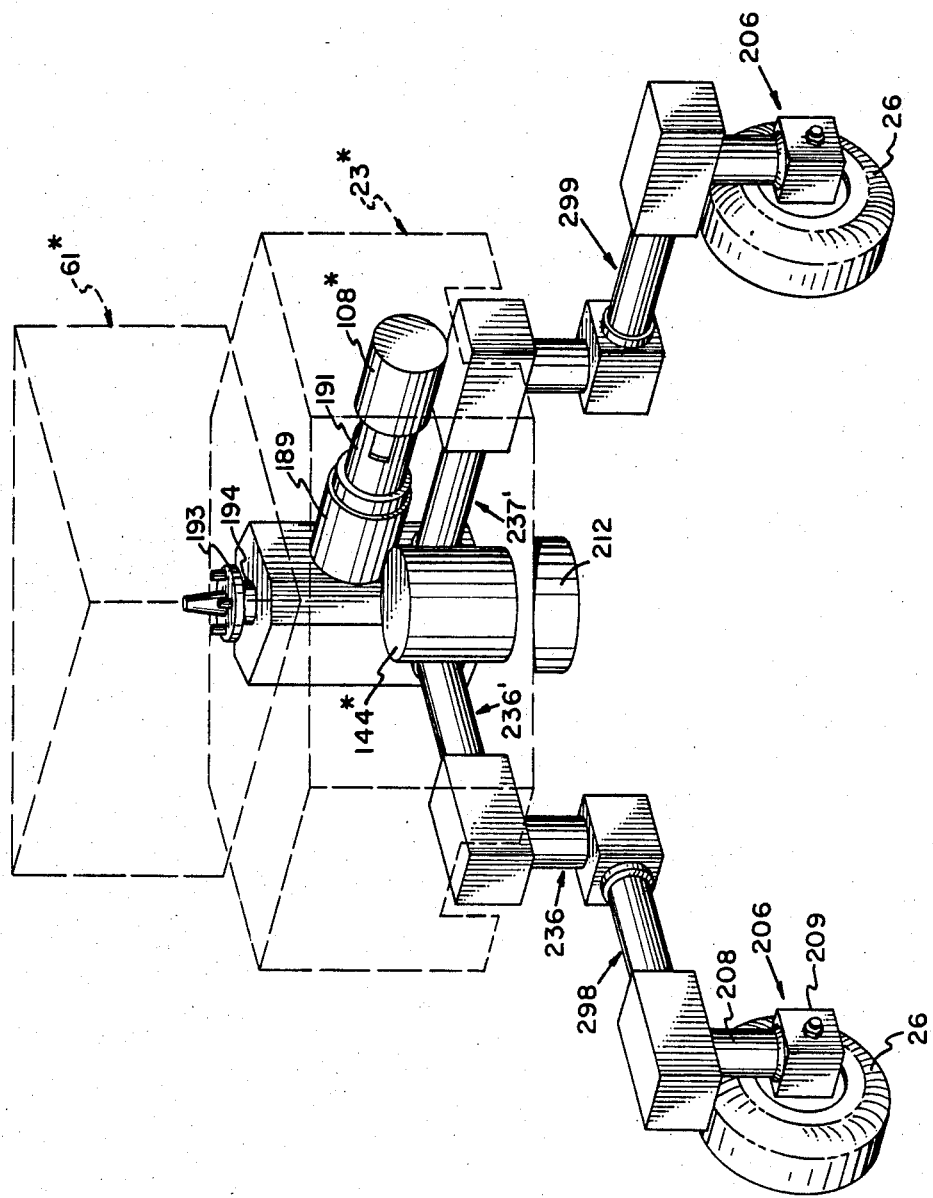
FIG. 32 is a perspective diagrammatic view of an extensible leg embodiment with concentric shafts showing the extensible leg members in their fully extended positions.

An extensible leg version of the invention employing concentric shafts is illustrated in FIG. 32. It comprises similar components as the non-extensible embodiment of the invention shown in FIG. 26 and, in addition, comprises extensible leg assemblies 235, 236 and 237, and related components to provide for their extension and retraction. This embodiment of the invention incorporates a steering motor 108*, a flexible coupling 191 and a gear reducer 189 as well as a drive motor 144* and associated gear reducer 212 similar in nature to the non-extensible concentric shaft version of the invention shown in FIG. 26. The concentric shaft members 235', 236' and 237' perform the same function in terms of drive and steering power to the wheel assemblies 206, as described above for the non-extensible leg assemblies.

The mobile base shown in FIG. 32 further comprises pivotable longitudinal leg members 297, 298 and 299 (297 being hidden from view). These leg assemblies can extend and retract when the mobile base is in translation in a manner similar to that shown in FIGS. 20 and 21 for the non-concentric shaft version of the invention and, for the version of this invention shown in FIG. 34, in a manner shown in FIG. 36 when the mobile base is stationary.

FIG. 33 illustrates one embodiment of the extensible leg assemblies 235, 236 and 237 where a separate motor 240 powers retraction and extension of the leg members 297, 298 and 299. In this embodiment, steering motor 108* and drive motor 144* perform the same functions as those described earlier with respect to the non-extensible concentric shaft version of the invention shown in FIG. 27. Leg member 297 employs a pair of concentric shafts 244 and 246 with terminating gears 248, 249, 250 and 251 for transfer of drive and steering power to wheel assembly 206. A horizontal housing 256 and a terminating housing 211 enclose these concentric shafts and associated gears.

The extensible leg assemblies 235, 236 and 237 also comprise a vertical member 254 connected with concentric shaft member 235' and longitudinal leg member 297. This vertical member is pivotable about itself along region 300. A vertical steering shaft 258 having upper and lower terminating gears 259 and 260 transfers steering power from gear 202 to gear 248 for transfer down to wheel assembly 206 via steering shaft 262 and its associated terminating gears 248 and 249.

Vertical housing 254 also encloses a vertical drive shaft 264 with terminating gears 265 and 266 for transfer of drive power from gear 223 to gear 250, and then through concentric drive shaft 246, gear 251, gear 224, shaft 226, gear 227, and gear 228 coupled to axle 28*, thus rotating wheel 26.

Motor 240 powers extension and retraction of leg members 297, 298 and 299 by use of gear 266 turning chain 268 which is then positioned about gear 269 on vertical housing 254 associated with each leg assembly. In operation this leg extension-retraction operates in a manner similar to the embodiment of the mobile base shown in FIG. 15 and discussed earlier. In particular, extension and retraction of the legs while in translation is accomplished in a manner so as to maintain the wheels in the same orientation as shown in FIGS. 24A and 24B. Extension and retraction of the leg assemblies when the mobile base is stationary corresponds to a pirouetting of the wheels shown in FIGS. 25A and 25B.

As shown in FIG. 33, the angular movement of longitudinal leg members 297, 298 and 299 is limited by use of block 302 and associated limit switches 304 and 306. Block 302 is attached to chain 268 so as to activate switch 304 when the leg members are retracted in one orientation (clockwise or counter-clockwise) while switch 306 is activated when the leg members are retracted in the other orientation.

Figure 34:
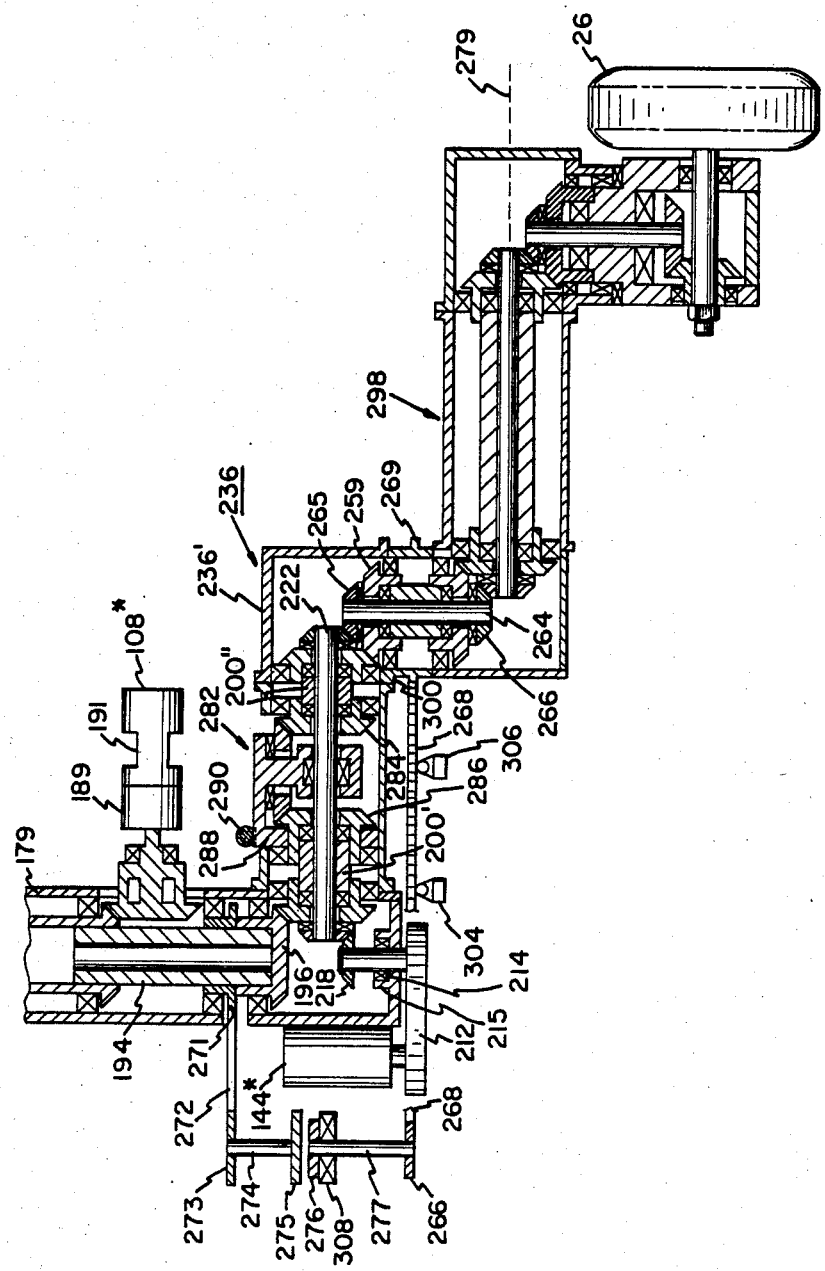
FIG. 34 is a side cross-sectional view of an extensible leg assembly similar to that shown in FIG. 33 but illustrating an alternative embodiment using a planetary gear assembly to independently steer two of the wheel assemblies and a clutch assembly to extend and retract the leg members.

FIG. 34 illustrates a version of the concentric shaft extensible leg assembly mobile base which eliminates the pirouetting of the wheels when stationary extension and retraction is performed. In all respects, except extension and retraction, the concentric shafts and gears associated with this version correspond to those shown in FIG. 33.

In particular, a separate motor 240 (see FIG. 33) is not used to drive extension and retraction chain 268 but rather a clutch assembly 270 is used which derives its motive power from gear 271 connected to steering shaft 194, which in turn is powered by steering motor 108*. Gear 271 via chain 272 turns gear 273. Gear 273 is coupled to shaft 274 terminating at a clutch plate 275. This clutch plate is brought in contact with clutch plate 276 when extension or retraction of the leg assembly is desired. Otherwise, chain 268 is held fixed with respect to mobile base central housing 179 and concentric shaft members 235', 236' and 237' connected thereto by contacting chassis reference plate 308. This plate is mechanically connected to central housing 179. Shaft 277 and gear 266 causes endless chain 268 to move in a manner analogous to that shown in FIG. 33 so as to cause corresponding extension and retraction movement of the leg members 297, 298 and 299. However, in a non-translation situation, the legs extend and retract not with the wheels oriented in the same direction, but rather with the wheels oriented perpendicular to the longitudinal axis 279 of the respective leg member 297, 298 or 299.

Figure 35:
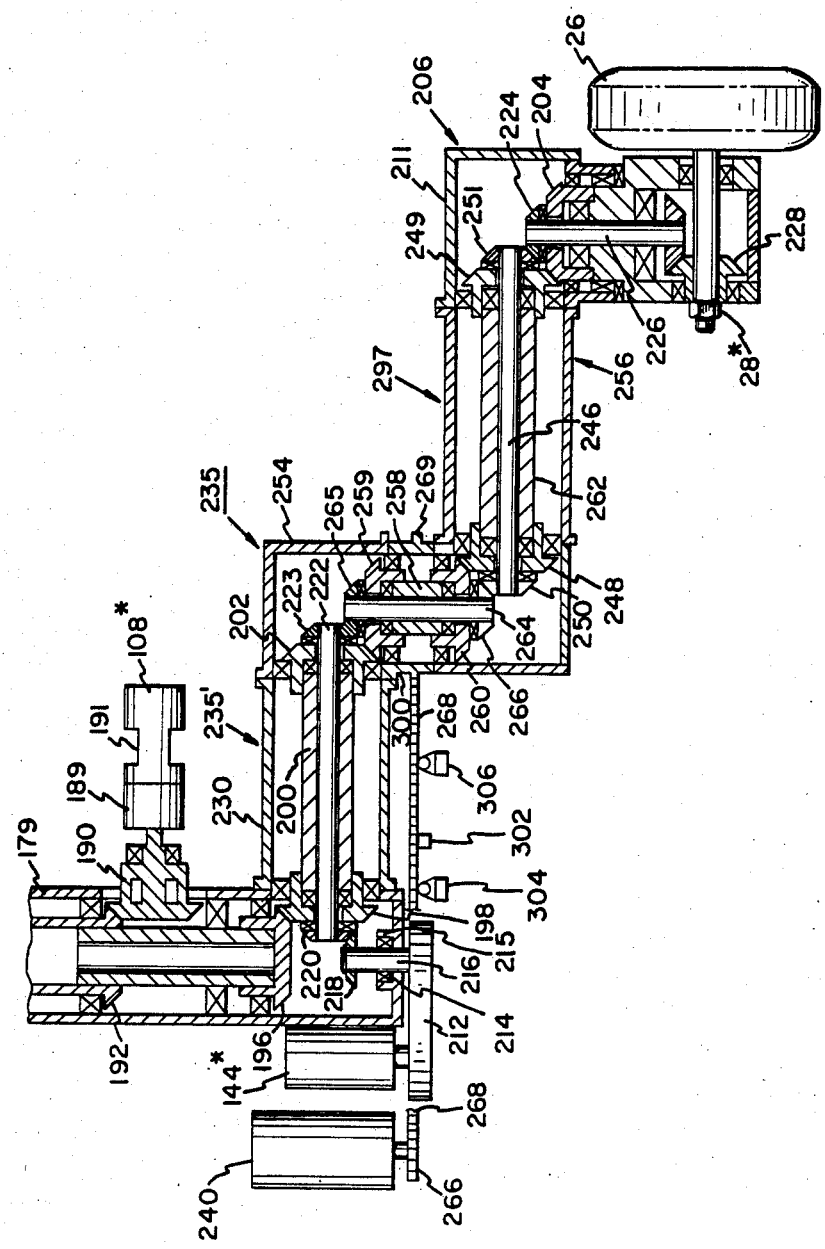
FIG. 35A is an enlarged front elevational view of the planetary gear assembly shown in FIG. 34 illustrating the means for positioning the yoke of the planetary gear assembly for individually steering the associated wheel of that leg assembly.
FIG. 35B is a side elevational view taken along line 35B—35B of FIG. 35A, showing the motor for driving two worm gears.

In order to achieve this perpendicular relationship of the wheels with respect to their respective leg members, it is necessary that two of the wheels be oriented without affecting the orientation of the third wheel. Thus, two of the leg assemblies (such as leg assemblies 236 and 237) include a rotable yoke planetary gear assembly 282, while the third leg assembly (such as 235) includes a fixed yoke planetary gear assembly 282 as shown in FIGS. 34 and 35.

In order to obtain separate turning of the wheels, leg members 298 and 299 each incorporate the rotable yoke planetary gear assembly 282 as shown in FIGS. 34, 35A and 35B. This planetary gear assembly comprises a yoke 283, an input gear 284, an output gear 286, a planetary gear 287, a ring gear 288 secured to yoke 283, and a worm gear 290 meshed with the ring gear. Input shaft 200' connects to input gear 284 while output shaft 200" connects to output gear 286. When the wheels of each leg assembly are aligned with each other, each yoke 283 is oriented in the same manner, typically as shown in FIG. 34 where an upright orientation is illustrated.

By turning worm gear 290, yoke 283 can be rotated in either a clockwise or counter-clockwise direction as shown by arrows 292 and 294. Worm gear 290 is independently driven from a motor 296. This motor also turns the worm gear associated with the other leg member (member 298 or 299) in the opposite direction by means of shaft 295. Thus, the two yokes move in equal but opposite directions whenever motor 296 is energized. By restraining shaft 200', gear 284 is likewise restrained. This result is accomplished by keeping steering motor 108* in a fixed position. Worm gears 290 for leg members 298 and 299 simultaneously turn in opposite directions and therefore cause their associated wheels to be turned in opposite directions as shown in FIGS. 36C and 36F. Typically 120° movement is required as explained below with reference to FIG. 36. Although leg assembly 235 in this embodiment also has a planetary gear assembly, the purpose of this assembly is only to obtain a direction reversal of shaft 200" with respect to shaft 200' so as to be in conformity with the output direction of planetary assemblies 282 associated with leg assemblies 236 and 237.

Once each wheel is positioned perpendicular to the end of its leg member, the retraction gear 266 is engaged via clutch assembly 270 causing the leg members to retract with power being obtained through steering motor 108*. Drive motor 144* may also be energized to help overcome rolling friction between the wheels and the floor surface. Since the steering motor 108* is also adjusting the steering of the wheel assemblies as retraction is underway, the wheels maintain their perpendicular relationship to the end of the leg members. Similarly, the wheels maintain their perpendicular relationship while undergoing extension from a retracted position.

Once the wheels are either in the retracted or extended position, return of the wheels to the same orientation is obtained by turning planetary gear yokes 282 via worm gear 290 in a reverse direction from that originally described.

The actual sequence of events with respect to extension and retraction of this version of the mobile base can best be understood by reference to FIGS. 36A, B, C, D, E, F and G where retraction of the leg members is shown. A corresponding, but opposite, sequence of events would occur for extension of the leg members. With regard to retraction of the leg members, it is seen in FIG. 36A that the wheels 26 are initially oriented in the same direction for translational movement. In order to retract the legs without translation, the wheels are initially turned via steering motor 108* so as to cause wheel 26' associated with leg member 297 to be perpendicular to the longitudinal axis of this leg member. As seen in FIG. 36B, wheels 26" and 26''', associated with leg members 298 and 299 also are oriented in the same direction as wheel 26'.

As shown in FIG. 36C, wheel 26" is then turned 120° in a clockwise direction (as viewed from above the mobile base) while wheel 26''' is rotated 120° in the counterclockwise direction; with their resulting positions being shown in solid and their initial positions being shown in phantom. At this time, each wheel is perpendicular to its associated leg member and, consequently, turning the leg members via chain 268 will cause the wheels to follow the inward movement of the leg assemblies such as shown in FIG. 36D. This activation of the leg members is accomplished by clutch plate 276 contacting clutch plate 275 and thereby being powered by steering motor 108*. Since the steering motor is causing the retractions of the leg members, the wheels are simultaneously steered so as to maintain their perpendicular relationship to their respective leg members. Turret 61 is also simultaneously turned.

Once the leg members are in their fully retracted positions, the wheels can be readjusted so as to be in the same orientation by turning wheels 26" and 26''' in the direction opposite to that as previously executed by the planetary gear assemblies. This result is shown in FIG. 36F with the final wheel positions shown in solid and their previous positions shown in phantom.

As shown by apex 303 on turret 61* in FIGS. 36A and F, the turret undergoes a 180° turn as the leg members are retracted. This result is due to the wheels being positioned on opposite sides of their respective leg members in these figures. In order to obtain the turret's original orientation, a 180° turn of the wheels can be performed as shown in FIG. 36G.

FIG. 38 presents an overall flow chart of the sequence of events depicted in FIGS. 36A–36F.

Although the above discussion was directed to retraction of the leg assemblies, FIGS. 36G, F, E, D, C, B and A when applied in this reverse order equally describe the extension of the leg members. If original turret orientation is not required, the 180° turning of the wheel assemblies shown between FIGS. 36G and F need not be performed.

Electronics

Figure 37:
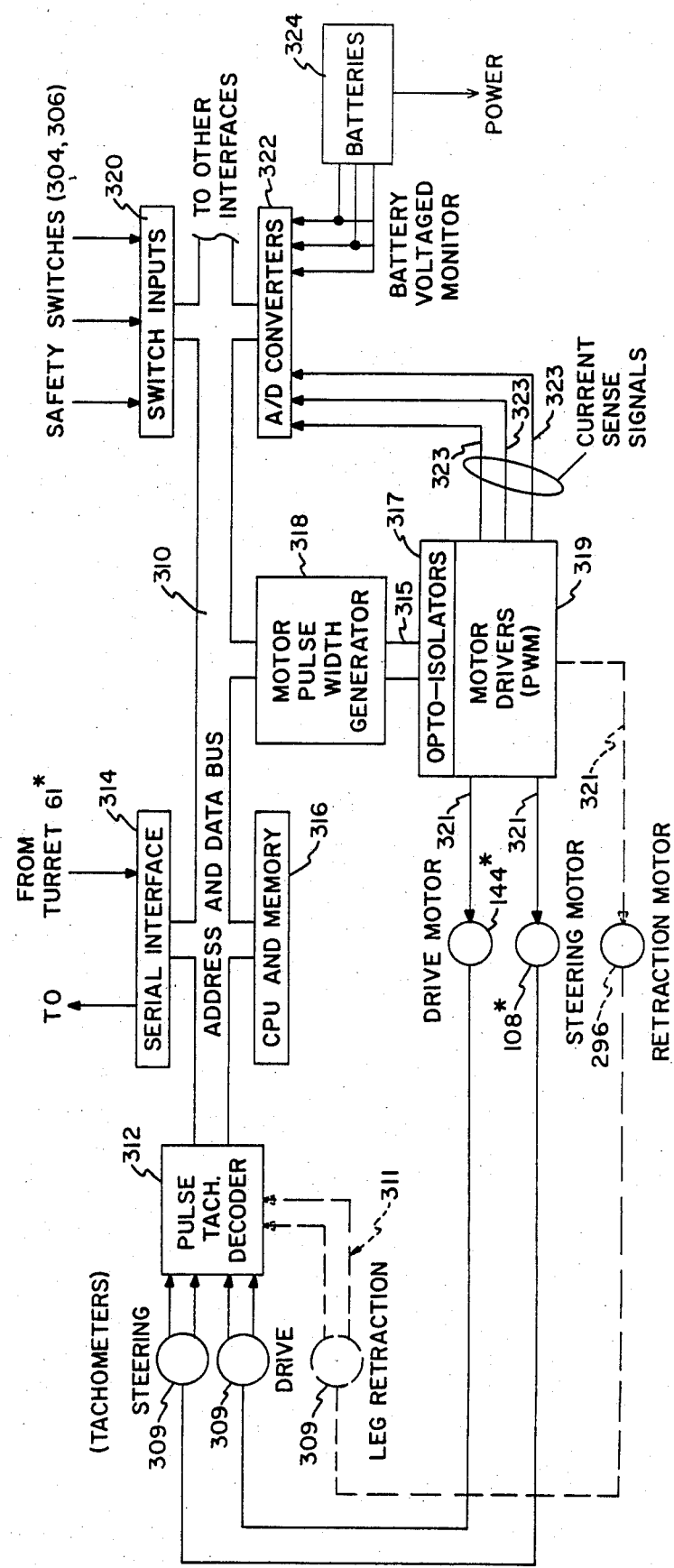
FIG. 37 is an overall block diagram of the electrical interconnects of the motors, central processing unit (CPU), switch, external signals and battery associated with the present invention.

FIG. 37 presents the overall electronic components and their interconnections used to control the mobile base. As shown there, and address and data bus 310 interconnects a pulse tachometer decoder 312, a serial interface 314, a central processing unit (CPU) and memory 316, a motor pulse width generator 318, switch inputs 320, and analog to digital (A/D) connectors 322. Separate tachometers 309 are associated with the steering motor 108*, the drive motor 144* and the retraction motor (if used) 296. These tachometers generate signals on output lines 311 which are decoded by pulse decoder 312. These signals are interpreted by the CPU which in turn instructs the motor pulse width generator as to which motor is to be driven a particular amount.

The motor pulse width generator in turn generates signals on output 315 which are isolated by optical isolators 317 and then amplified by pulse width modulation motor drivers 319. A separate motor driver is associated with each motor and the high power pulses from the drivers connected to their respective motor by means of output lines 321 Thus, a closed loop control system is disclosed for driving each motor.

The motor drives also generate analog voltages on outputs 323 representative of the amount of drive information generated for each motor. These voltages as well as the voltage from batteries 324 used to power the overall system are converted to digital information by A/D converter 322. The A/D converter digital information is communicated to the CPU with information from serial interface 314 and switched inputs 320.

Thus, the CPU under program control (stored in its memory) is able to receive and interpret information from the motor tachometers, the motor drivers, the serial interface associated with turret 61*, the safety switches and the battery voltage condition, in order to steer and drive the mobile base, and, for extensible leg embodiments, extend and retract its leg assemblies.

The mobile bases of the present invention are found to be efficient in their usage of electricity, are easy to navigate, and have a relatively high reliability. In addition, the concentric shaft embodiments of the invention are exceptionally clean in their operation and therefore particularly suited for applications requiring ultra-clean environments. It is therefore apparent that the objects set forth above are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed is:

1. A mobile base for movement on a surface comprising:
A. a plurality of leg assemblies, each leg assembly including,
 1. a pivotable wheel assembly, the wheel assembly including,
  a. a wheel having an axle extending therefrom,
  b. a first gear mounted to the axle so as to impart axial rotation thereto,
  c. a second gear meshed with the first gear so as to impart rotation to the first gear,
  d. a shaft having one end connected to the second gear for rotation thereof,
  e. a third gear connected to the second end of the shaft,
  f. an outer housing positioned about the shaft and the axle so that pivoting the housing causes simultaneous pivoting of the wheel, and
  g. a steering gear secured to the housing for controlling the pivotal orientation of the wheel assembly, and
 2. a leg assembly comprising,
  a. a second drive shaft,
  b. a first steering shaft concentrically positioned about the second drive shaft,
  c. gears mounted at each end of the second drive shaft and the second steering shaft with the gear at a first end of the second drive shaft meshed with the third gear of the wheel assembly and the gear at the first end of the first steering shaft meshed with the steering gear of the wheel assembly housing;
B. a universal driving and steering assembly comprising
 1. a third drive shaft having a drive gear mounted thereon for simultaneous engagement with the drive gear on the second end of the second drive shaft of each leg assembly, and
 2. a second steering shaft having a steering gear mounted thereon for simultaneous engagement with the steering gear on the second end of the first steering shaft of each leg assembly;
C. first means for powering the third drive shaft; and
D. second means for powering the second steering shaft;
whereby simultaneous steering and/or axial rotation of the wheels associated with each of the wheel assemblies is achieved and further wherein the transfer of power from the drive and steering means to the wheel and wheel assembly of each leg assembly is achieved through the use of concentric shafts.

2. A mobile base as defined in claim 1 further comprising means mounted about the concentric shafts so as to enclose the concentric shafts and gears connected thereto.

3. A mobile base as defined in claim 2 wherein the first and second power means are electrical motors with associated gear reducers mechanically interconnected to the third drive shaft and second steering shaft, respectively.

4. A mobile base for movement about a surface, comprising:
A. a plurality of extensible leg assemblies, each leg assembly including,
 1. a wheel
  a. a wheel having an axle extending therefrom,
  b. a steering gear connected to the wheel assembly so as to turn the axle with respect to the surface upon which the mobile base is mounted, and
  c. means for axially rotating the axle upon which the wheel is mounted including a first gear mounted to the axle, a second gear meshed with the first gear, a first drive shaft connected to the second gear at one end of the first drive shaft, and a third gear mounted to the first drive shaft;
 2. a first longitudinal leg member having,
  a. a distal end pivotally mounted to the wheel assembly,
  b. a second drive shaft having gears mounted at each end, the gear at the distal end mechanically engaged with the third gear of the wheel assembly,
  c. a first steering shaft concentrically mounted about the second drive shaft, the first steering shaft having gears mounted at each end, the gear at the distal end mechanically engaged with the steering gear of the wheel assembly, and
  d. a first housing enclosing at least a portion of the first steering shaft;
 3. a vertically oriented member comprising,
  a. a third drive shaft having gears mounted at each end, the gear at its depending end mechanically engaged with the gear at the proximal end of the second drive shaft,
  b. a second steering shaft concentrically mounted about the third drive shaft, the second steering shaft having gears mounted at each end, the gear at its distal end mechanically engaged with the gear at the proximal end of the first steering shaft, c. a second housing enclosing at least a portion of the second steering shaft, the housing having a first portion pivotable about the second portion, the first portion of the housing connected to the first housing; and d. a leg pivoting gear mounted to the first portion of the second housing so as to control the pivoting of said portion;

4. a second longitudinal leg member comprising, a. a fourth drive shaft having gears mounted at each end thereof, the gear mounted at the distal end of the fourth drive shaft mechanically connected to the gear mounted at the proximal end of the third drive shaft, b. a third steering shaft concentrically mounted about the fourth drive shaft, the third steering shaft having gears mounted at each end, the gear mounted at the distal end of the third steering shaft mechanically engaged to the gear mounted at the proximal end of the second steering shaft;

B. a universal driving and steering assembly comprising, 1. a fifth drive shaft having a gear mounted thereon for mechanically engaging with each gear mounted at the proximal end of each fourth drive shaft, 2. a fourth steering shaft having a gear mounted at its distal end for mechanically engaging with each gear mounted at the proximal end of each third steering shaft;

C. means mechanically coupled to the universal drive and steering assembly so as to power the fifth drive shaft;

D. means mechanically coupled to the universal drive and steering assembly so as to power the fourth steering shaft; and E. means connected about each leg pivoting gear for controllably rotating the first leg member of each leg assembly;

whereby simultaneous steering of each wheel assembly and axial rotation of each wheel is achieved and whereby the leg assemblies can be pivoted outward to increase the zone of stability of the mobile base and pivoted inward to allow the mobile base to pass through narrow passageways and whereby concentric shafts transfer drive and steering power from the drive and steering means to the wheel and wheel assembly, respectively, of each leg assembly.

5. A mobile base as defined in claim 4 wherein the means connected to each leg pivoting gear comprises a motor and associated gear reducer, the gear reducer having an output gear, and further comprises an endless chain connected about the output gear and each leg pivoting gear so as to simultaneously pivotally retract each first leg member by moving the chain in a first direction and to simultaneously pivotally extend each first leg member by moving the chain in a second direction.

6. A mobile base as defined in claim 5 wherein the steering means and the drive means each comprise electric motors and associated gear reducers, each gear reducer having an output gear and wherein the fifth drive shaft has a second gear mounted thereon for mechanical engagement with the output gear of the drive motor gear reducer and wherein the fourth steering shaft has a second gear mounted thereon for mechanical engagement with the output gear of the steering motor gear reducer.

7. A mobile base as defined in claim 6 wherein the universal driving and steering assembly further comprises a housing mounted about the fifth drive shaft and fourth steering shaft and wherein the drive means, steering means and retraction means are referenced to this housing and further wherein a pair of microswitches are mechanically referenced to this housing so as to be alternatively activated when the first leg members reach predetermined positions.

8. A mobile base as defined in claim 7 wherein the predetermined positions are when the first leg members reach retraction limits in either the counter-clockwise or clockwise directions.

9. A mobile base as defined in claim 8, further comprising a block mounted to the endless chain so as to cause the microswitches to open and close.

10. A mobile base for movement about a surface, comprising:

A. N wheel assemblies, where N is an integer greater than 2, each wheel assembly including, 1. a wheel having an axle extending therefrom, 2. a sterring gear connected to the wheel assembly so as to turn the axle with respect to the surface upon which the mobile base is mounted, and 3. means for axially rotating the axle upon which the wheel is mounted including a first gear mounted to the axle, a second gear meshed with the first gear, a first drive shaft connected to the second gear at one end of the first drive shaft, and a third gear mounted to the first drive shaft;

B. N extensible leg assemblies each having a distal wheel assembly end for pivotal interconnecting to a respective wheel assembly, each leg assembly including, 1. a first longitudinal leg member having, a. a distal end for pivotally mounting to the wheel assembly, b. a second drive shaft having gears mounted at each end, the gear at the distal end mechanically engaged with the third gear of the wheel assembly, c. a first steering shaft concentrically mounted about the second drive shaft, the first steering shaft having gears mounted at each end, the gear at the distal end for mechancially engaging with the steering gear of the wheel assembly, and d. a first housing enclosing at least a portion of the first steering shaft;

2. a vertically oriented member comprising, a. a third device shaft having gears mounted at each end, the gear at its depending end mechanically engaged with the gear at the proximal end of the second drive shaft, b. a second steering shaft concentrically mounted about the third drive shaft, the second steering shaft having gears mounted at each end, the gear at its distal end mechanically engaged with the gear at the proximal end fo the first steering shaft, c. a second housing having first and second pivotal portions enclosing at least a portion of the second steering shaft, the first portion of the housing connected to the first housing, and d. a leg pivoting gear mounted to the first portion of the second housing so as to control the pivoting of said portion;

3. a second longitudinal leg member comprising,
   a. a fourth drive shaft having gears mounted at each end, the gear mounted at its distal end mechanically connected to the gear mounted on the proximal end of the third drive shaft,
   b. a third steering shaft concentrically mounted about a portion of the fourth drive shaft, having gears mounted at each end, the gear mounted at its distal end mechanically engaged with the gear mounted on the proximal end of the second steering shaft,
   c. for N−1 of the leg assemblies, a fourth steering shaft concentrically mounted about the proximal end of the fourth drive shaft, having a gear mounted about its proximal end;
   d. for said N−1 of the leg assemblies, a planetary gear assembly having,
      1. an output gear connected to the proximal end of the third steering shaft,
      2. an input gear connected to the distal end of the fourth steering shaft,
      3. a central gear mechanically engaged with both the input and output gear of the planetary gear assembly,
      4. means for positioning the central gear axially about the third drive shaft while engaged with the input and output gears of the planetary gear assembly so as to impart steering motion to the associated wheel assembly when the fourth steering shaft is maintained in a stationary position; and
      5. means connected to the means for changing the position of the central gear of the planetary gear assembly so as to simultaneously move the central gear of each planetary gear assembly so as to impart steering movement to the wheel assembly associated with each such extensible leg assembly;
C. a universal driving and steering assembly comprising,
   1. a fifth drive shaft having a gear mounted thereon for mechanically engaging with each gear mounted at the proximal end of each fourth drive shaft,
   2. a fifth steering shaft having a gear mounted at its distal end for mechanically engaging with each gear mounted at the proximal end of each fourth steering shaft for said N−1 leg assemblies and the gear mounted at the proximal end of the third steering shaft for the Nth leg assembly;
D. means mechanically coupled to the universal drive and steering assembly so as to power the fifth drive shaft;
E. means mechanically coupled to the universal drive and steering assembly so as to power the fifth steering shaft; and
F. means connected about each leg pivoting gear for controllably rotating the first longitudinal leg member of each leg assembly;
whereby simultaneous turning and axial rotation of each wheel is achieved and whereby the leg assemblies can be pivoted outward to increase the zone of stability of the mobile base and pivoted inward to allow the mobile base to pass through narrow passageways, whereby concentric shafts transfer drive and steering power from the drive and steering means to the wheel and wheel assembly, respectively, for each leg assembly; and further wherein retraction and extension of the leg assemblies can be achieved without wheel pirouetting.

11. A mobile base as defined in claim 10 wherein the means for extending and retracting of the leg assemblies comprises,
A. means for coupling to the output of the steering motor for receiving power therefrom,
B. a clutch removably engageable with the power receiving means, and
C. means connected to the output of the clutch for transferring rotational movement when the clutch is in the engaged position to each of the leg assemblies via an endless loop chain connecting the three leg assemblies to said gear.

12. A mobile base as defined in claim 11 in which the value of N is equal to three.

13. A mobile base as defined in claim 10 wherein the means for changing the position of the central gear of each planetary gear assembly comprises a worm gear for turning each central gear and a motor for rotating the worm gear.

14. A mobile base as defined in claim 1 wherein the first, second, and third gears of the pivotable wheel assembly, the gears of the leg assembly, and the drive gear and steering gear of the universal driving and steering assembly are slotted and wherein the associated shaft or axle to which each of said gears is attached further includes a keyway for engagement with said slots; whereby said gears are able to impart axial rotation to the respective axle or shaft while not being longitudinally fixed to the respective axle or shaft, thereby minimizing tolerance buildup for the interconnection of gears.

15. A mobile base as defined in claim 14 further comprising C-rings mounted to the ends of the first and second drive shafts and to the third drive shaft, and wherein the second and third gears of the pivotable wheel assembly, the gears mounted at each end of the second drive shaft, and the drive gear mounted to the third drive shaft are longitudinally captured on said shafts by said C-rings.

16. A mobile base as defined in claim 15 further comprising bearings mounted between adjacent gears connected to the drive and steering shafts so that longitudinal movement of each gear on each steering shaft is restrained by the adjacent gear on the corresponding drive shaft.

17. A mobile base as defined in claim 4 wherein the axles, drive shafts and steering shafts further incorporate keyways and wherein the corresponding gears mounted on said axles and shafts incorporate slotted regions for engagement with said keyways; whereby said gears are able to impart axial rotation to the respective axle or shaft while not being longitudinally fixed to the respective axle or shaft, thereby minimizing tolerance buildup for the interconnection of gears.

18. A mobile base as defined in claim 10 wherein the axles, drive shafts and steering shafts further incorporate keyways and wherein the corresponding gears mounted on said axles and shafts incorporate slotted regions for engagement with said keyways; whereby said gears are able to impart axial rotation of the respective axle or shaft while not being longitudinally fixed to the respective axle or shaft, thereby minimizing tolerance buildup for the interconnection of gears.

19. A mobile base for movement on a surface comprising:
A. a plurality of leg assemblies, each leg assembly including, 1. A pivotal wheel assembly, the wheel assembly comprising,
   a. a wheel,
   b. means for imparting axial rotation to the wheel, and
   c. means for pivoting the wheel about a pivoting axis substantially perpendicular to its rotational axis; and
2. a pojecting arm assembly comprising,
   a. a drive shaft interconnected at a first end to the means for imparting axial rotation to the wheel, and
   b. a steering shaft concentrically positioned with respect to the drive shaft and interconnected at a first end to the means for pivoting the wheel;
B. a universal driving and steering assembly comprising,
   1. first means for engaging the second end of each drive shaft and for controlling the rotation of each drive shaft, and
   2. second means for engaging the second end of each steering shaft and for controlling the rotation of each steering shaft; and
C. means for powering the first and second means of the universal driving and steering assembly; whereby simultaneous steering and/or axial rotation of the wheels associated with each of the wheel assemblies is achieved and further wherein the transfer of power from the powering means to the wheel and wheel assembly of each leg assembly is achieved through the use of concentric shafts.

20. A mobile base as defined in claim 19 further comprising means mounted about the drive and steering shafts of each arm assembly so as to enclose these concentric shafts.

21. A mobile base as defined in claim 20 wherein the powering means comprise at least one electrical motor and an associated gear reducer mechanically interconnected to the first means of the universal driving and steering assembly and one electrical motor and an associated gear reducer mechanically interconnected to the second means of the universal driving and steering assembly.

22. A mobile base as defined in claim 21 wherein each drive shaft has a gear mounted on its second end and wherein each steering shaft has a gear mounted on its second end and further wherein the first means of the universal driving and steering assembly comprises a second drive shaft and a gear mounted at one end thereof in engagement with the gears mounted on the second end of each arm assembly drive sheet and wherein the universal driving and steering assembly further comprises a second steering shaft and a gear mounted at one end thereof in engagement with the gears mounted on the second of each arm assembly steering shaft.

23. A mobile base as defined in claim 22 wherein the means for imparting axial rotation the wheels of each wheel assembly comprises an axle connected to the wheel so as to project therefrom, a first gear mounted to the projection of the axle so as to impart axial rotation thereto, a second gear meshed with the first gear so as to impart rotation to the first gear, a wheel assembly shaft having one end connected to the second gear for rotation thereof, and a third gear connected to the second end of the wheel assembly shaft; wherein the means for pivoting the wheel comprises an outer housing positioned about the wheel assembly shaft and the axle so that pivoting the wheel assembly causes simultaneous pivoting of the wheel, and a steering gear secured to the housing for controlling the pivotal orientation of the wheel assembly; and wherein each arm assembly drive shaft and steering shaft each have a gear mounted on their respective first ends for engaging with the respective third gear and the steering gear of the pivotal wheel assembly.

24. A mobile base as defined in claim 23 wherein the first, second, and third gears of the wheel assembly, the gears of the arm assembly, and the drive gear and steering gear of the universal driving and steering assembly are slotted and wherein the associated shaft or axle to which each of said gears is attached further includes a keyway for engagement with said slots; whereby said gears are able to impart axial rotation to the respective axle or shaft while not being longitudinally fixed to the respective axle or shaft, thereby minimizing tolerance buildup for the interconnection of gears.

25. A mobile base as defined in claim 24 further comprpising C-rings mounted to the ends of the drive shafts, and wherein the second and third gears of the wheel assembly, the gears mounted at each end of the arm assembly drive shaft, and the drive gear mounted to the universal driving and steering assembly drive shaft are captured on said shafts by said C-rings.

26. A mobile base as defined in claim 25 further comprising bearings mounted between adjacent gears connected to the drive and steering shafts so that longitudinal movement of each gear on each steering shaft is restrained by the adjacent gear on the corresponding drive shaft.

27. A mobile base as defined in claim 26 further comprising a turret rotatably mounted above the arm assemblies and means associated with the second means of the universal driving and steering assembly so that turning of the wheel assemblies causes similar turning of the turret.

28. A mobile base as defined in claim 27 wherein each wheel has a radius (r); wherein the first gear of the wheel assembly has a plurality of teeth, N1, facing toward the wheel connected to the axle, where N1 is an integer; wherein the second gear of the wheel assembly has a plurality of teeth, N2, where N2 is an integer, and wherein the second gear defines a wheel pivot radius (r') for the wheel as the distance between the center of the second gear and the wheel perimeter that contacts the surface upon which the mobile base moves; wherein the ratio of the teeth of the second gear to the teeth of the first gear (i.e., N2, N1) is substantially the same as the ratio of the wheel pivot radius to the wheel radius (i.e., N2/N1 =r'/r); whereby simultaneous steering and axial rotation of the wheels associated with each of the wheel assemblies is achieved and further wherein steering of the wheel assemblies can be achieved without translation of the wheel assemblies while allowing the wheels to rotate about their axes without slippage.

29. A mobile base as defined in claim 23 wherein each wheel has a radius (r); wherein the first gear of the wheel assembly has a plurality of teeth, N1, facing toward the wheel connected to the axle, where N1 is an integer; wherein the second gear of the wheel assembly has a plurality of teeth, N2, where N2 is an integer, and wherein the second gear defines a wheel pivot radius (r') for the wheel as the distance between the center of the second gear and the wheel perimeter that contacts the surface upon which the mobile base moves; wherein the ratio of the teeth of the second gear to the teeth of the first gear (i.e., N2/N1) is substantially the same as the ratio of the wheel pivot radius to the wheel radius (i.e., N2/N1 =r'/r); whereby simultaneous steering and axial rotation of the wheels associated with each of the wheel assemblies is achieved and further wherein steering of the wheel assemblies can be achieved without translation of the wheel assemblies while allowing the wheels to rotate about their axes without slippage.

30. A mobile base as defined in claim 19 further comprising a turret rotatably mounted above the arm assemblies and means associated with the second means of the universal driving and steering assembly so that turning of the wheel assemblies causes similar turning of the turret.

31. A mobile base as defined in claim 19 wherein the plurality of leg assemblies is equal to 3.

32. A mobile base for moving about a surface comprising:
A. a plurality of extensible leg assemblies, each leg assembly comprising,
  1. a wheel assembly comprising,
    a. a wheel
    b. means for imparting axial rotation to the wheel, and
    c. means for pivoting the wheel about a pivoting axis substantially perpendicular to its rotational axis; and
  2. a first longitudinal leg member comprising,
    a. a first drive shaft having proximal and distal ends and having means at its distal end engaged with the means for imparting axial rotation to the wheel, and
    b. a first steering shaft concentrically positioned with respect to the first drive shaft, the first steering shaft having proximal and distal ends and having means mounted at its distal end for engagement with the means for pivoting the wheel,
  3. a vertically-oriented member comprising,
    a. a second drive shaft, having proximal and distal end and having means at its distal end for engagement with the proximal end of the first drive shaft,
    b. a second steering shaft concentrically positioned with respect to the second drive shaft, the second steering shaft having proximal and distal ends and having means at its distal end for engagement with the proximal end of the first steering shaft, and
    c. means mounted to the vertically oriented member for controlling the pivoting of said member and said first longitudinal leg member;
  4. a second longitudinal leg member comprising,
    a. a third drive shaft having proximal and distal ends and having means at its distal end for engagement with the proximal end of the second drive shaft,
    b. a third steering shaft concentrically positioned with respect to the third drive shaft, the third steering shaft having proximal and distal ends and having means mounted at its distal end for engagement with the proximal end of the second steering shaft;
B. a universal driving and steering assembly comprising,
  1. means for engagement with and powering of the proximal end of the third drive shaft of each extensible leg assembly, and
  2. means for engagement with and powering of the proximal end of each third steering shaft; and
C. means for simultaneously powering the means for pivoting the first longitudinal leg members;
whereby steering of each wheel assembly and axial rotation of each wheel is achieved and further whereby the first longitudinal leg members can be pivoted outward to increase the zone of stability of the mobile base and pivoted inward to allow the mobile base to pass through narrow passageways and still further whereby concentric shafts transfer drive and steering power to the wheel and wheel assemblies of each leg assembly.

33. A mobile base as defined in claim 32 wherein the means for simultaneously powering the means for pivoting the first longitudinal leg members comprises a motor and an associated gear reducer, the gear reducer having an output gear, and further comprising an endless chain connected about the output gear and about each first longitudinal leg member pivoting means so as to simultaneously pivotally retract each first longitudinal leg member by moving the chain in a first direction and to simultaneously pivotally extend each first longitudinal leg member by moving the chain in a second direction.

34. A mobile base as defined in claim 33 wherein the means for powering the universal drive and steering assembly comprises first and second electric motors and associated gear reducers, each gear reducer having an output gear and further wherein the universal driving and steering assembly comprises a fourth drive shaft having proximal and distal ends with a first gear mounted at its distal end for engagement with the proximal end of each third drive shaft and a second gear mounted on the proximal end of the fourth drive shaft for engagement with the output gear of the drive motor gear reducer and further wherein the universal driving and steering assembly comprises a fourth steering shaft having proximal and distal ends with a first gear mounted at its distal end for engagement with the proximal end of each third steering shaft and a second gear mounted on the proximal end of the fourth steering shaft for engagement with the output gear of the steering motor gear reducer.

35. A mobile base as defined in claim 34 wherein the universal driving and steering assembly further comprises a housing mounted about the fourth drive shaft and fourth steering shaft and wherein the means for powering the means for pivoting the first longitudinal leg members is referenced to this housing and further wherein a pair of microswitches are mechanically referenced to this housing so as to be alternatively activated when the first longitudinal leg members reach predetermined positions.

36. A mobile base as defined in claim 35 wherein the predetermined positions are when the first longitudinal leg members reach retraction limits in either the counterclockwise or clockwise directions.

37. A mobile base as defined in claim 36 further comprising a block mounted to the endless chain so as to cause the microswitches to open and close.

38. A mobile base as defined in claim 37 wherein the means for imparting axial rotation to the wheels of each wheel assembly comprises an axle connected to the wheel so as to project therefrom, a first gear mounted to the projection of the axle so as to impart axial rotation thereto, a second gear meshed with the first gear so as to impart rotation to the first gear, a wheel assembly shaft having one end connected to the second gear for rotation thereof, and a third gear connected to the second end of the wheel assembly shaft; wherein the means for pivoting the wheel comprises an outer housing positioned about the wheel assembly shaft and the axle so that pivoting the wheel assembly causes simultaneous pivoting of the wheel, and a steering gear secured to the housing for controlling the pivotal orientation of the wheel assembly; and wherein each first longitudinal leg member drive shaft and steering shaft each have a gear mounted on their respective first ends for engaging with the respective third gear and the steering gear of the pivotal wheel assembly.

39. A mobile base as defined in claim 38 wherein each wheel has a radius (r); wherein the first gear of the wheel assembly has a plurality of teeth, N1, facing toward the wheel connected to the axle, where N1 is an integer; wherein the second gear of the wheel assembly has a plurality of teeth, N2, where N2 is an integer, and wherein the second gear defines a wheel pivot radius (r') for the wheel as the distance between the center of the second gear and the wheel perimeter that contacts the surface upon which the mobile base moves; wherein the ratio of the teeth of the second gear to the teeth of the first gear (i.e., N2/N1) is substantially the same as the ratio of the wheel pivot radius to the wheel radius (i.e., N2/N1 =r'/r); whereby simultaneous steering and axial rotation of the wheels associated with each of the wheel assemblies is achieved and further wherein steering of the wheel assemblies can be achieved without translation of the wheel assemblies while allowing the wheels to rotate about their axes without slippage.

40. A mobile base as defined in claim 32 wherein the means for imparting axial rotation to the wheels of each wheel assembly comprises an axle connected to the wheel so as to project therefrom, a first gear mounted to the projection of the axle so as to impart axial rotation thereto, a second gear meshed with the first gear so as to impart rotation to the first gear, a wheel assembly shaft having one end connected to the second gear for rotation thereof, and a third gear connected to the second end of the wheel assembly shaft; wherein the means for pivoting the wheel comprises an outer housing positioned about the wheel assembly shaft and the axle so that pivoting the wheel assembly causes simultaneous pivoting of the wheel, and a steering gear secured to the housing for controlling the pivotal orientation of the wheel assembly; and wherein each first longitudinal leg member drive shaft and steering shaft each have a gear mounted on their respective first ends for engaging with the respective third gear and the steering gear of the pivotal wheel assembly.

41. A mobile base as defined in claim 40 wherein each wheel has a radius (r); wherein the first gear of the wheel assembly has a plurality of teeth, N1, facing toward the wheel connected to the axle, where N1 is an integer; wherein the second gear of the wheel assembly has a plurality of teeth, N2, where N2 is an integer, and wherein the second gear defines a wheel pivot radius (r') for the wheel as the distance between the center of the second gear and the wheel perimeter that contacts the surface upon which the mobile base moves; wherein the ratio of the teeth of the second gear to the teeth of the first gear (i.e., N2/N1) is substantially the same as the ratio of the wheel pivot radius to the wheel radius (i.e., N2/N1 =r'/r); whereby simultaneous steering and axial rotation of the wheels associated with each of the wheel assemblies is achieved and further wherein steering of the wheel assemblies can be achieved without translation of the wheel assemblies while allowing the wheels to rotate about their axes without slippage.

42. A mobile base for movement about a surface, comprising:
A. N wheel assemblies, where N is an integer greater than 2, each wheel assembly comprising,
 1. a wheel,
 2. means for axially rotatiang the wheel, and
 3. means for steering the wheel about a pivoting axis substantially perpendicular to its rotational axis;
B. N extensible leg assemblies, each having a distal wheel assembly end for pivotal interconnection to a respective wheel assembly, each leg assembly including,
 1. a first longitudinal leg member comprising,
   a. a distal end for pivotally mounting to the wheel assembly,
   b. a first drive shaft having proximal end distal ends and having means mounted at its distal end for engagement with the means for axially rotating the wheel,
   c. a first steering shaft concentrically positioned with respect to the first drive shaft, the first steering shaft having proximal and distal ends and having means mounted at its distal end for engagement with the means for steering the wheel;
 2. a vertically-oriented member comprising,
   a. a second drive shaft having proximal and distal ends and having means mounted at its distal end for engagement with the proximal end of the first drive shaft,
   b. a second steering shaft concentrically positioned with respect to the second drive shaft, the second steering shaft having proximal and distal ends and having means mounted at its distal end for engagement with the proximal end of the first steering shaft, and
   c. means mounted to the vertically oriented member for controlling the pivoting of said member and said first longitudinal leg member;
 3. a second longitudinal leg member comprising,
   a. a third drive shaft having proximal and distal ends, and having means mounted at its distal end for engagement with the proximal end of the second drive shaft,
   b. a third steering shaft concentrically mounted about a portion of the third drive shaft, having proximal and distal ends and having means mounted at its distal end for engagement with the proximal end of the second steering shaft,
   c. for N−1 of the leg assemblies, a fourth steering shaft concentrically positioned with respect to the proximal end of the third drive shaft and having proximal and distal ends;
   d. for said N−1 leg assemblies, a planetary gear assembly having,
    1. an output gear connected to the proximal end of the third steering shaft,
    2. an input gear connected to the distal end of the fourth steering shaft,
    3. a central gear mechanically engaged with both the input and output gear of the planetary gear assembly,
    4. means for positioning the central gear axially about the third drive shaft while engaged with the input and output gears of the planetary assembly so as to impart steering motion to the associated wheels when the fourth steering shaft is maintained in a stationary position, and 5. means connected to the means for changing the position of the central gear of the planetary gear assembly so as to simultaneously move the central gear of each planetary gear assembly so as to impart steering movement to the wheel associated with each such extensible leg assembly;

C. a universal driving and steering assembly comprising, 1. a fourth drive shaft having proximal and distal ends, and having means mounted at its distal end for engagement with the proximal end of the third drive shaft of each leg assembly; and 2. a fifth steering shaft having proximal and distal ends, and having means mounted at its distal end for engagement with the proximal end of each fourth steering shaft of said N−1 leg assemblies and with the proximal end of the third steering shaft of the Nth leg assembly; and D. means coupled to the universal driving and steering assembly comprising, 1. means for powering the proximal end of the fourth drive shaft; and 2. means for powering the proximal end of the fifth steering shaft;

whereby simultaneous turning and axial rotation of each wheel is achieved and whereby the first longitudinal leg members can be pivoted outward to increase the zone of stability of the mobile base and pivoted inward to allow the mobile base to pass through narrow passageways, whereby concentric shafts transfer driving and steering power from the drive and steering means to the wheel for each leg assembly, and further wherein retraction and extension of the first longitudinal leg members can be achieved without wheel pirouetting.

43. A mobile base as defined in claim 42 wherein the means for controlling pivoting of the vertically oriented member comprises, A. means for coupling to the output of the steering powering means;

B. a clutch removably engaged with the coupled output from the steering powering means;

C. an endless loop chain mounted about each vertically oriented member; and

D. means connected to the output of the clutch and to the endless chain for moving the endless chain when the clutch is in the engaged position so as to pivot each vertically oriented member.

44. A mobile base as defined in claim 43 in which the value of N is equal to three.

45. A mobile base as defined in claim 44 wherein the means for changing the position of the central gear of each planetary gear assembly comprises a worm gear for turning each central gear and a motor for rotating the worm gear.

46. A mobile base as defined in claim 44 wherein the means for imparting axial rotation to the wheels of each wheel assembly comprises an axial connected to the wheel so as to project therefrom, a first gear mounted to the projection of the axle so as to impart axial rotation thereto, a second gear meshed with the first gear so as to impart rotation to the first gear, a wheel assembly shaft having one end connected to the second gear for rotation thereof, and a third gear connected to the second end of the wheel assembly shaft; wherein the means for pivoting the wheel comprises an outer housing positioned about the wheel assembly shaft and the axle so that pivoting the wheel assembly causes simultaneous pivoting of the wheel, and a steering gear secured to the housing for controlling the pivotal orientation of the wheel assembly; and wherein each first longitudinal leg member drive shaft and steering shaft each have a gear mounted on their respective first ends for engaging with the respective third gear and the steering gear of the pivotal wheel assembly.

47. A mobile base as defined in claim 39 wherein each wheel has a radius (r); wherein the first gear of the wheel assembly has a plurality of teeth, N1, facing toward the wheel connected to the axle, where N1 is an integer; wherein the second gear of the wheel assembly has a plurality of teeth, N2, where N2 is an integer, and wherein the second gear defines a wheel pivot radius (r′) for the wheel as the distance between the center of the second gear and the wheel perimeter that contacts the surface upon which the mobile base moves; wherein the ratio of the teeth of the second gear to the teeth of the first gear (i.e., N2/N1) is substantially the same as the ratio of the wheel pivot radius to the wheel radius (i.e., N2/N1 = r′/r); whereby simultaneous steering and axial rotation of the wheels associated with each of the wheel assemblies is achieved and further wherein steering of the wheel assemblies can be achieved without translation of the wheel assemblies while allowing the wheels to rotate about their axes without slippage.

48. A mobile base as defined in claim 42 wherein the means for imparting axial rotation to the wheels of each wheel assembly comprises an axle connected to the wheel so as to project therefrom, a first gear mounted to the projection of the axle so as to impart axial rotation thereto, a second gear meshed with the first gear so as to impart rotation to the first gear, a wheel assembly shaft having one end connected to the second gear for rotation thereof, and a third gear connected to the second end of the wheel assembly shaft; wherein the means for pivoting the wheel comprises an outer housing positioned about the wheel assembly shaft and the axle so that pivoting the wheel assembly causes simultaneous pivoting of the wheel, and a steering gear secured to the housing for controlling the pivotal orientation fo the wheel assembly; and wherein each first longitudinal leg member drive shaft and steering shaft each have a gear mounted on their respective first ends for engaging with the respective third gear and the steering gear of the pivotal wheel assembly.

49. A mobile base as defined in claim 48 wherein each wheel has a radius (r); wherein the first gear of the wheel assembly has a plurality of teeth, N1, facing toward the wheel connected to the axle, where N1 is an integer; wherein the second gear of the wheel assembly has a plurality of teeth, N2, where N2 is an integer, and wherein the second gear defines a wheel pivot radius (r′) for the wheel as the distance between the center of the second gear and the wheel perimeter that contacts the surface upon which the mobile base moves; wherein the ratio of the teeth of the second gear to the teeth of the first gear (i.e., N2/N1) is substantially the same as the ratio of the wheel pivot radius to the wheel radius (i.e., N2/N1 = r′/r); whereby simultaneous steering and axial rotation of the wheels associated with each of the wheel assemblies is achieved and further wherein steering of the wheel assemblies can be achieved without translation of the wheel assemblies while allowing the wheels to rotate about their axes without slippage.

* * * * *